US011009612B2

United States Patent
Hattori

(10) Patent No.: US 11,009,612 B2
(45) Date of Patent: May 18, 2021

(54) CONTROL APPARATUS, MEASUREMENT SYSTEM, CONTROL METHOD, AND PROGRAM

(71) Applicant: Seiko EG&G Co., Ltd., Chiba (JP)

(72) Inventor: Yuki Hattori, Chiba (JP)

(73) Assignee: SEIKO EG&G CO., LTD., Chiba (JP)

( * ) Notice: Subject to any disclaimer, the term of this patent is extended or adjusted under 35 U.S.C. 154(b) by 44 days.

(21) Appl. No.: 16/019,212

(22) Filed: Jun. 26, 2018

(65) Prior Publication Data
US 2019/0004189 A1    Jan. 3, 2019

(30) Foreign Application Priority Data
Jun. 29, 2017    (JP) ................. 2017-127910

(51) Int. Cl.
| | |
|---|---|
| G01T 7/02 | (2006.01) |
| G01T 1/167 | (2006.01) |
| G01T 1/17 | (2006.01) |
| G01T 1/24 | (2006.01) |

(52) U.S. Cl.
CPC ............... *G01T 1/24* (2013.01); *G01T 1/167* (2013.01); *G01T 1/17* (2013.01); *G01T 7/02* (2013.01)

(58) Field of Classification Search
CPC .. G01T 1/24; G01T 1/17; G01T 1/167; G01T 7/02
See application file for complete search history.

(56) References Cited

U.S. PATENT DOCUMENTS

| | | | |
|---|---|---|---|
| 6,225,634 B1 | 5/2001 | Atrashkevich et al. | |
| 6,228,664 B1 | 5/2001 | Bronson et al. | |
| 2011/0049380 A1* | 3/2011 | Dubeau | G01T 3/00 250/390.07 |

(Continued)

FOREIGN PATENT DOCUMENTS

| | | |
|---|---|---|
| JP | 2013-213807 A | 10/2013 |
| JP | 2014-066557 A | 4/2014 |

(Continued)

OTHER PUBLICATIONS

"Gamma-ray Spectrometry Using a Germanium Semiconductor Detector ($2^{nd}$ Edition)", Radiation Measurement Method Series, No. 7, Ministry of Education, Culture, Sports, Science and Technology—Japan, p. 77-87, Jul. 30, 2004.

(Continued)

*Primary Examiner* — Christine S. Kim
(74) *Attorney, Agent, or Firm* — Brinks Gilson & Lione

(57) ABSTRACT

A control apparatus may include a processor for calculating a detection efficiency, which is detected by a gamma-ray detection unit, of gamma-rays emitted from a sample stuffed into a first container. A shape of the first container is a shape which surrounds at least a part of the gamma-ray detection unit that detects the gamma-rays. An area inside the first container is divided into a plurality of similar areas which is area similar in shape to each other. The gamma-ray detection unit detects the gamma-rays emitted from the sample included in each the similar areas for each of the plurality of similar areas. The processor calculates the detection efficiency as a similar-area-detection efficiency based on a result of detection performed by the gamma-ray detection unit.

13 Claims, 12 Drawing Sheets

(56) References Cited

U.S. PATENT DOCUMENTS

| | | | |
|---|---|---|---|
| 2012/0245858 A1* | 9/2012 | Carpenter | G01B 15/02 702/28 |
| 2014/0231639 A1* | 8/2014 | O'Connor | G01N 33/24 250/255 |
| 2017/0343680 A1* | 11/2017 | Kim | G01T 7/00 |

FOREIGN PATENT DOCUMENTS

| | | |
|---|---|---|
| JP | 2014-085163 A | 5/2014 |
| JP | 2017/156172 A | 9/2017 |
| WO | WO 2009/138360 A2 | 11/2009 |

OTHER PUBLICATIONS

Pierino De Felice et al., "Fast procedures for coincidence-summing correction in γ-ray spectrometry", Applied Radiation and Isotopes, 52, Italy, p. 745-752, 2000.

R. Furukawa et al., "Proficiency testing with uncertainty evaluation for measuring activities per unit mass of $^{134}$Cs and $^{137}$Cs in brown rice in Japan", Applied Radiation and Isotopes, vol. 126, date available online: Mar. 30, 2017, pp. 249-251.

Noguchi Masayasu, "γ-ray spectrometry-experiment and practical training", Nikkan Kogyo Shimbun, 1980, 8 pages.

Gordon Gilmore, "Practical Gamma-ray Spectrometry", $2^{nd}$ Edition, John Wiley & Sons, Ltd., UK, 2011, 4 pages.

Notice of Allowance in Japan Application No. 2017-127910, dated Apr. 6, 2021, 5 pages.

\* cited by examiner

CONTROL APPARATUS, MEASUREMENT SYSTEM, CONTROL METHOD, AND PROGRAM

RELATED APPLICATIONS

This application claims priority under 35 U.S.C. § 119 to Japanese Patent Application No. 2017-127910 filed on Jun. 29, 2017, the entire content of which is hereby incorporated by reference.

BACKGROUND OF THE INVENTION

Field of the Invention

The present invention relates to a control apparatus, a measurement system, a control method, and a program.

Description of Related Art

Research and development of a technology are performed for calculating a count in which gamma-rays emitted from a sample are detected by a gamma-ray detection unit that detects the gamma-rays.

Where, there is a case where the gamma-rays emitted from the sample cause the gamma-ray detection unit to generate TCS (True Coincidence Summing) effect. The TCS effect is an effect which occurs in a case where two or more gamma-rays emitted from the sample are incident on a detection element of the gamma-ray detection unit at a time interval in which the gamma-ray detection unit is not capable of performing discrimination (for example, a time interval which is shorter than hundreds of nanoseconds). In this case, there is a case where the gamma-ray detection unit detects the two or more gamma-rays as one gamma-ray which has an energy that coincides with the sum of energies of the respective two or more gamma-rays. That is, the one gamma-ray is a virtual gamma-ray which does not actually exist. The TCS effect is an effect, which causes the gamma-ray detection unit to detect the gamma-ray that does not actually exist, among effects in which the gamma-rays are generated. The TCS effect may occur in a case where a radioactive nuclide, which emits gamma-rays of a measurement target, is a radioactive nuclide which is capable of emitting two or more gamma-rays at a time interval about picoseconds. In a case where the TCS effect occurs, a count of each of the two or more gamma-rays is smaller than an original count (that is a count in a case where it is possible to perform detection such that all the respective two or more gamma-rays can be discriminated). As a result, it is not possible to accurately calculate a detection efficiency, which is detected by the gamma-ray detection unit, of each of the two or more gamma-rays emitted from the radioactive nuclide which emits each of the two or more gamma-rays. As a result, there is a case where it is not possible to accurately calculate radioactivity of the radioactive nuclide.

In order to solve the above problems, research and development are performed for TCS correction (True Coincidence Summing effect correction) in which the count detected as a count smaller than the original count due to the TCS effect is corrected. For example, a method is known for correcting the count using a point source which emits the gamma-rays (for example, "Gamma-ray Spectrometry Using a Germanium Semiconductor Detector (2nd Edition)", Radiation Measurement Method Series, No. 7", Ministry of Education, Culture, Sports, Science and Technology—Japan, p. 77-87, Jul. 30, 2004 and "Fast Procedures for Coincidence-Summing Correction In γ-Ray Spectrometry", Applied Radiation and Isotopes, p. 745-752, 2000).

However, in a case where the sample which is the measurement target is a volume-shaped sample, it is difficult to previously acquire a detection efficiency of all point locations in the sample using the minute radioactivity standard. Therefore, it is difficult to apply the methods disclosed in Non-Patent Documents to the volume-shaped sample. The TCS correction which are including a step of measurement of the radioactivity standard having the same shape as the shape of the volume-shaped sample, a step of deriving a single function of an energy, which is corresponding to the shape of the sample, vs. detection efficiency, a step of performing the TCS correction using the derived single function has been proposed.

However, in the TCS correction using the single function, it is known that the detection efficiency, acquired after the TCS correction is performed, becomes higher than an original detection efficiency. This is a fact confirmed by proficiency tests (UNNO, et. al., Radioisotopes, Vol. 65, No. 4, p. 181-190, YUNOKI, et. al., radioactivity measurement proficiency test performed on brown rice sample containing radioactive cesium to which uncertainty evaluation is adopted, NMIJ 2015 result presentation) which are done in the past. The fact suggests that the TCS correction, in which a gamma-ray occurrence location is taken into consideration, is important.

Where, as the TCS correction, in which the gamma-ray occurrence location is taken into consideration, a method for deeming a column-shape sample as a set of minute disk (minute and thick column) samples and calculating the detection efficiency, acquired after the TCS correction is completely performed on the column-shape sample, based on the detection efficiency, which is acquired after the TCS correction is completely performed on a part of the minute disk sample, is disclosed in Japanese Patent Application No. 2016-038232. However, it is difficult to apply the method to the sample (for example, a Marinelli-shaped sample or the like) which has a shape other than the column shape.

Meanwhile, it is possible to realize the TCS correction in which the gamma-ray occurrence location is taken into consideration using the TCS correction based on Monte-Carlo simulation. However, in the method, it is necessary to perform the Monte-Carlo simulation whenever a measurement condition is changed, and time which is necessary to perform the TCS correction is long, thereby being not realistic.

From the above, in the method according to the related art, there is a case where it is not possible to accurately calculate the detection efficiency, which is detected by the gamma-ray detection unit, of the gamma-rays emitted from the sample which has a shape other than the column shape. Meanwhile, the problem is found in the above-described proficiency test.

Therefore, the present invention is made in consideration of the problems of the related art, and provides each of a control apparatus, a measurement system, a control method, and a program which is capable of accurately calculating a detection efficiency, which is acquired by a gamma-ray detection unit, of the gamma-rays emitted from a sample stuffed into a first container based on a calculated similar area detection efficiency without performing Monte-Carlo simulation.

SUMMARY OF THE INVENTION (1) According to an aspect of the present invention, there is provided a control apparatus which may include a processor for calculating a detection efficiency, which is detected by a gamma-ray detection unit, of gamma-rays emitted from a sample stuffed into a first container. A shape of the first container is a shape which surrounds at least a part of the gamma-ray detection unit that detects the gamma-rays. An area inside the first container is divided into a plurality of similar areas which is area similar in shape to each other. The gamma-ray detection unit detects the gamma-rays emitted from the sample included in each the similar areas for each of the plurality of similar areas. And, the processor calculates the detection efficiency as a similar-area-detection efficiency based on a result of detection performed by the gamma-ray detection unit.

(2) The first container is a Marinelli-container.

(3) The gamma-ray detection unit includes a detection element that detects the gamma-rays. And the first container surrounds at least the detection element.

(4) The processor calculates the similar-area-detection efficiency based on a first reference information, for each of a plurality of second containers which stuffs the sample therein and having a similar in shape to the first container. The first reference information is including at least an information in which a plurality of second container information and a plurality of first-reference-detection efficiency information respectively associated with each of the second container information are associated with each other. Each of the second container information indicates the second containers, respectively. And the first-reference-detection efficiency information indicates a detection efficiency detected by the gamma-ray detection unit, for each of gamma-rays having energies different from each other among the gamma-rays emitted from the sample inside each of the second containers.

(5) The processor divides the area inside the first container into the plurality of similar areas based on area inside each of the second containers.

(6) A third container which stuffs having the sample therein and having a similar shape to the first container is provided. The processor calculates the similar-area-detection efficiency based on a second reference information. The second reference information is an information in which a plurality of volume relating to the third container and a plurality of detection efficiencies respectively associated with each of the volume are associated with each other. And each of the detection efficiencies is detected by the gamma-ray detection unit, for each of gamma-rays having energies different from each other among the gamma-rays emitted from the sample inside the third container having the volume corresponding to the detection efficiency.

(7) Two of the third container having different volumes from each other are provided. And the processor divides the area inside the first container into the plurality of similar areas based on area inside each of the third containers.

(8) The processor includes a plurality of reference-detection efficiencies that serve as references for the detection efficiency. The processor generates the second reference information based on an information in which the plurality of reference-detection efficiencies and a plurality of volumes respectively associated with each of the reference-detection efficiencies are associated with each other.

(9) A third container which stuffs having the sample therein and having a similar shape to the first container is provided. The processor calculates the similar-area-detection efficiency based on a second reference information. The second reference information is an information in which a plurality of mass relating to the third container and a plurality of detection efficiencies respectively associated with each of the mass are associated with each other. And each of the detection efficiencies is detected by the gamma-ray detection unit, for each of gamma-rays having energies different from each other among the gamma-rays emitted from the sample inside the third container having the mass corresponding to the detection efficiency.

(10) The processor further divides each of the similar area into a plurality of partial areas, for each of the plurality of similar areas. Herein the gamma-ray detection unit detects the gamma-rays emitted from the sample included in each the partial areas for each of the plurality of the partial areas. The processor calculates the detection efficiency as a partial-area-detection efficiency based on a result of detection performed by the gamma-ray detection unit. And, the processor calculates the similar-area-detection efficiency based on the partial-area-detection efficiency calculated for each of the partial area.

(11) The processor performs TCS correction against the similar area detection efficiency which is calculated for each of the plurality of similar areas. And the processor calculates the detection efficiency, which is detected by the gamma-ray detection unit, of the gamma-rays emitted from the sample inside the first container, based on a result of the TCS correction.

(12) According to another aspect of the present invention, there is provided a measurement system which may include the control apparatus according to above (1), and a shielding body that surrounds the first container, and shields the gamma-rays emitted from the sample included inside the first container.

(13) The measurement system may further include a pulse height analysis apparatus that generates spectrum of the gamma-rays detected by the gamma-ray detection unit.

(14) The measurement system may further include the gamma-ray detection unit.

(15) According to still another aspect of the present invention, there is provided a control method for a control apparatus, which calculates a detection efficiency, detected by a gamma-ray detection unit, of gamma-rays emitted from a sample stuffed into a first container that has a shape surrounding at least a part of the gamma-ray detection unit that detects the gamma-rays. The control method may include a step of dividing an area inside the first container into similar areas which is area similar in shape to each other, a step of detecting the gamma-rays emitted from the sample included in each the similar areas for each of the plurality of similar areas, by the gamma-ray detection unit, and a step of calculating the detection efficiency as a similar-area-detection efficiency as based on a result of the detection performed by the gamma-ray detection unit.

(16) According to still another aspect of the present invention, there is provided a program causing a computer to calculate a detection efficiency, which is detected by a gamma-ray detection unit, of gamma-rays emitted from a sample stuffed into a first container having a shape surrounding at least a part of the gamma-ray detection unit that detects the gamma-rays. The program causing the computer to perform a step of dividing an area inside the first container into similar areas which is area similar in shape to each other, a step of detecting the gamma-rays emitted from the sample included in each the similar areas for each of the plurality of similar areas, by the gamma-ray detection unit, and a step of calculating the detection efficiency as a similar-area-detection efficiency based on a result of the detection performed by the gamma-ray detection unit.

According to the control apparatus of the aspect of (1), it is possible to accurately calculate the detection efficiency, which is detected by the gamma-ray detection unit, of the gamma-rays emitted from the sample stuffed into the first container based on the calculated similar area detection efficiency without performing the Monte-Carlo simulation.

Meanwhile, the "similar shape" according to the present invention includes each of a plurality of shapes which can be represented by parameters of same type. The parameters of same type are, for example, volume, mass a ratio of lengths of respective sides, a height, or a bottom area. In the similar shape, values of the parameters may be different each other. For example, a cylindrical shape object which has an outer diameter of 10 cm, an inner diameter of 5 cm, and a height of 3 cm and a cylindrical shape object which has an outer diameter of 20 cm, an inner diameter of 5 cm, and a height of 3 cm are similar shapes in the present invention. That is, in the example, the parameters which represent a shape of these objects are the outer diameter, the inner diameter, and the height. And, a plurality of shapes represented the parameters are similar shape, even in a case of any values of the three parameters in the present invention.

According to the control apparatus of the aspect of (2), it is possible to accurately calculate the detection efficiency, which is detected by the gamma-ray detection unit, of the gamma-rays emitted from the sample stuffed into the first container, which is the Marinelli container, based on the calculated similar area detection efficiency without performing the Monte-Carlo simulation.

According to the control apparatus of the aspect of (3), it is possible to accurately calculate the detection efficiency, which is detected by the gamma-ray detection unit, of the gamma-rays emitted from the sample stuffed into the first container, which is a container having a shape surrounding at least the detection element of the gamma-ray detection unit, based on the calculated similar area detection efficiency without performing the Monte-Carlo simulation.

According to the control apparatus of the aspect of (4), it is possible to accurately calculate the detection efficiency, which is detected by the gamma-ray detection unit, of the gamma-rays emitted from the sample stuffed into the first container based on the similar area detection efficiency calculated based on the first reference information without performing the Monte-Carlo simulation.

According to the control apparatus of the aspect of (5), it is possible to accurately calculate the detection efficiency, which is detected by the gamma-ray detection unit, of the gamma-rays emitted from the sample stuffed into each of the second container based on the plurality of similar areas acquired through performing division on the area inside the first container based on the areas of the containers of the plurality of second containers without performing the Monte-Carlo simulation.

According to the control apparatus of the aspect of (6), it is possible to accurately calculate the detection efficiency, which is detected by the gamma-ray detection unit, of the gamma-rays emitted from the sample stuffed into the first container based on the similar area detection efficiency calculated based on the second reference information without performing the Monte-Carlo simulation.

According to the control apparatus of the aspect of (7), it is possible to accurately calculate the detection efficiency, which is detected by the gamma-ray detection unit, of the gamma-rays emitted from the sample stuffed into the first container based on the plurality of similar areas, acquired through division performed on the area inside the first container, based on the areas inside the respective containers of the third containers, which have volumes indicated by the second reference information, that is, two third containers which have different volumes, without performing the Monte-Carlo simulation.

According to the control apparatus of the aspect of (8), it is possible to accurately calculate the detection efficiency, which is detected by the gamma-ray detection unit, of the gamma-rays emitted from the sample stuffed into the first container based on the generated second reference information without performing the Monte-Carlo simulation.

According to the control apparatus of the aspect of (9), it is possible to accurately calculate the detection efficiency, which is detected by the gamma-ray detection unit, of the gamma-rays emitted from the sample stuffed into the first container based on the similar area detection efficiency calculated based on the second reference information without performing the Monte-Carlo simulation.

According to the control apparatus of the aspect of (10), it is possible to accurately calculate the detection efficiency, which is detected by the gamma-ray detection unit, of the gamma-rays emitted from the sample stuffed into the first container based on calculated partial area detection efficiency without performing the Monte-Carlo simulation.

According to the control apparatus of the aspect of (11), it is possible to accurately perform a process based on the calculated detection efficiency, that is, the detection efficiency, which is detected by the gamma-ray detection unit, of the gamma-rays emitted from the sample in the first container.

According to the measurement system of the aspects of (12) to (14), it is possible to accurately calculate the detection efficiency, which is detected by the gamma-ray detection unit, of the gamma-rays emitted from the sample stuffed into the first container based on the calculated similar area detection efficiency without performing the Monte-Carlo simulation.

According to the control method of the aspect of (15), it is possible to accurately calculate the detection efficiency, which is detected by the gamma-ray detection unit, of the gamma-rays emitted from the sample stuffed into the first container based on the calculated similar area detection efficiency without performing the Monte-Carlo simulation.

According to the program of the aspect (16), it is possible to cause the computer to accurately calculate the detection efficiency, which is detected by the gamma-ray detection unit, of the gamma-rays emitted from the sample stuffed into the first container based on the calculated similar area detection efficiency without performing the Monte-Carlo simulation.

DETAILED DESCRIPTION OF THE INVENTION

Embodiment

Hereinafter, a measurement system 1 according to an embodiment of the present invention will be described with reference to the accompanying drawings.

Figure 1:
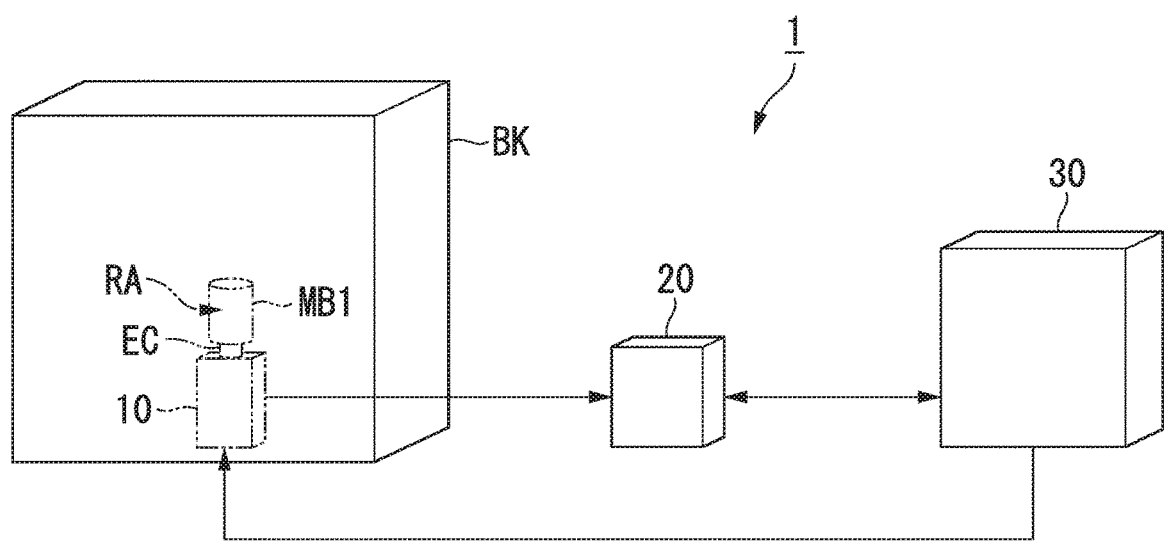
FIG. 1 is a diagram illustrating an example of a configuration of a measurement system 1 according to the embodiment.

FIG. 1 is a diagram illustrating an example of a configuration of the measurement system 1 according to the embodiment.

The measurement system 1 includes a gamma-ray detection unit 10, a pulse height analysis apparatus 20, a control apparatus 30, and a shielding body BK.

Meanwhile, the measurement system 1 may be configured to include another apparatus. In addition, in the measurement system 1, a part or an entirety of the gamma-ray detection unit 10, the pulse height analysis apparatus 20, and the control apparatus 30 may be integrally configured. In addition, in the embodiment, a process of converting an analog signal into a digital signal may be performed by a part or an entirety of the gamma-ray detection unit 10, the pulse height analysis apparatus 20, and the control apparatus 30, may be performed using a well-known method, or may be performed using a method which will be developed from now on. Therefore, the description thereof will not be repeated.

<Outline of Measurement System>

Hereinafter, an outline of the measurement system 1 will be described.

The measurement system 1 measures gamma-rays emitted from the sample RA which is a sample that includes one or more radioactive nuclides. More specifically, the measurement system 1 detects the gamma-rays emitted from the sample RA using the gamma-ray detection unit 10.

The measurement system 1 generates spectrum of gamma-rays detected by the gamma-ray detection unit 10 using the pulse height analysis apparatus 20. The spectrum indicate energy spectrum of the gamma-rays. The measurement system 1 performs a process based on the spectrum generated by the pulse height analysis apparatus 20 using the control apparatus 30. The process based on the spectrum is, for example, a process of calculating a detection efficiency of measurement target gamma-rays. The measurement target gamma-rays are gamma-rays emitted from a measurement target nuclide. The measurement target nuclide indicates a radioactive nuclide, which is previously received by the measurement system 1 from the user, and a radioactive nuclide of a target on which the measurement system 1 performs the process. The detection efficiency of the measurement target gamma-rays (or simply referred to as the gamma-rays) is a detection efficiency, which is acquired (or detected) by the gamma-ray detection unit 10, of the measurement target gamma-rays. Where, there is a case where a certain radioactive nuclide emits a plurality of gamma-rays in a case of disintegration of the radioactive nuclide. In this case, the gamma-rays emitted from the radioactive nuclide exist plural. In addition, in this case, energies of the plurality of respective gamma-rays are different from each other. That is, in a case where the measurement target nuclide emits the plurality of measurement target gamma-rays due to the disintegration, the control apparatus 30 performs a process of calculating a detection efficiency of respective one or more measurement target gamma-rays as one of processes based on the spectrum.

That is, the control apparatus 30 calculates the detection efficiency of the gamma-rays for each of the measurement target gamma-rays. The process of the control apparatus 30 calculating the detection efficiency of the gamma-rays is one of the processes based on the spectrum generated by the pulse height analysis apparatus 20. Meanwhile, the process based on the spectrum may be another process, such as a process of calculating a count of each of one or more measurement target gamma-rays, a process of calculating a count rate of the one or more measurement target gamma-rays, or a process of calculating the radioactivity of the measurement target nuclide.

Meanwhile, the detection efficiency of the measurement target gamma-rays (or simply referred to as the gamma-rays) indicates a ratio of the number of measurement target gamma-rays emitted from the sample RA to a count in which the measurement target gamma-rays are detected by the gamma-ray detection unit 10. The count of the measurement target gamma-rays (or simply referred to as the gamma-rays) indicates a number of times that the measurement target gamma-rays are detected by the gamma-ray detection unit 10. A count rate of the measurement target gamma-rays (or simply referred to as the gamma-rays) indicates number of times that the measurement target gamma-rays are detected by the gamma-ray detection unit 10 for each unit time.

In addition, the sample RA may be a radioactivity standard or may be another sample which includes the measurement target nuclide. Hereinafter, as an example, a case where the sample RA is a sample other than the radioactivity standard and includes one or more measurement target nuclides will be described.

Where, in a case where a plurality of measurement target gamma-rays are emitted due to the disintegration of the measurement target nuclide, there is a case where the plurality of measurement target gamma-rays cause the TCS effect to be generated in the gamma-ray detection unit 10.

The TCS effect is an effect which occurs in a case where two or more measurement target gamma-rays are incident on a detection element GC (not illustrated in FIG. 1) of the gamma-ray detection unit 10 at a time interval in which the gamma-ray detection unit 10 and the pulse height analysis apparatus 20 are not capable of performing discrimination (for example, a time interval which is shorter than hundreds of nanoseconds). In this case, there is a case where the gamma-ray detection unit 10 detects the two or more measurement target gamma-rays as one gamma-ray which has an energy that coincides with the sum of energies of the respective two or more measurement target gamma-rays. That is, the one gamma-ray is a virtual gamma-ray which does not actually exist. The TCS effect is an effect which causes the gamma-ray detection unit 10 and the pulse height analysis apparatus 20 to detect the gamma-ray that does not actually exist. The TCS effect may occur in a case where the measurement target nuclide, which emits the two or more measurement target gamma-rays, is a radioactive nuclide (for example, cobalt 60 or the like) which is capable of emitting the two or more measurement target gamma-rays at a time interval about picoseconds. In a case where the TCS effect occurs, a count of each of the two or more measurement target gamma-rays is smaller than an original count (that is, a count in a case respective two or more measurement target gamma-rays is detected to be discriminated). As a result, errors increase in a case where the detection efficiency, the count, the count rate, and the like of each of the two or more measurement target gamma-rays are calculated.

In order to solve a problem in which errors increase as described above, research and development are performed for TCS correction. The TCS correction is correction performed on a detected count in a case where a smaller count of each of the two or more measurement target gamma-rays having the possibility that the TCS effect is generated than an original count is detected to due to the TCS effect. The two or more measurement target gamma-rays are two or more measurement target gamma-rays emitted at a time interval about picoseconds among measurement target gamma-rays emitted in the case of the disintegration of the measurement target nuclide. For example, in a case where the measurement target nuclide is cobalt 60, the two or more measurement target gamma-rays include each of a gamma-ray having an energy of 1173 keV and a gamma-ray having an energy of 1332 keV among gamma-rays emitted from the cobalt 60.

As a method for performing the TCS correction, a method for calculating a TCS correction coefficient, which is used to correct the detected count using the radioactivity, a method disclosed in, for example, "γ-ray spectrometry-experiment and practical training, written by Noguchi Masayasu, Nikkan Kogyo Shimbun, 1980", "Gamma-ray Spectrometry Using a Germanium Semiconductor Detector (2nd Edition)", Radiation Measurement Method Series, No. 7", Ministry of Education, Culture, Sports, Science and Technology—Japan, Jul. 30, 2004", "Practical Gamma-ray Spectroscopy, written by Gordon Gilmore, Wiley, 2011", and the like, is known. The radioactivity standard is a sample, which is mixed such that multinuclide are uniformly distributed, and is a sample in which adjustment (previously calibration) is performed for the radioactivity of each of the plurality of radioactive nuclides to have a certified value. The method is a method for performing the TCS correction with respect to the count by multiplying the calculated TCS correction coefficient by the detected count. Where, in the method, as a deviation of a distance (for example, represented through dispersion) between a point in a container, which is attached to the gamma-ray detection unit 10 and into which the radioactivity standard is stuffed, and an effective center of the gamma-ray detection unit 10 is small, that is, as the container is small, it is possible to accurately correct the detected count using the calculated TCS correction coefficient. In contrast, as the deviation is large, it is not possible to accurately correct the count using the TCS correction coefficient. The reason is that a possibility that both of the two or more measurement target gamma-rays are detected by gamma-ray detection unit 10 becomes lower as locations in which two or more measurement target gamma-rays having the possibility that the TCS effect is generated are emitted get farther from the effective center. As a result, it becomes difficult to correct this TCS effect due to the two or more measurement target gamma-rays to be generated in a large-volume sample. In other words, in the method, in a case where a light source, which emits the measurement target gamma-rays, is treated as a point light source, it is possible to accurately correct the count. However, in a case where the light source is a volume-shaped light source, it is difficult to accurately correct the count. Therefore, it is difficult to apply the method to the volume-shaped sample.

Where, the TCS correction which are including a step of measurement of the radioactivity standard having the same shape as the shape of the volume-shaped sample, a step of deriving a single function of an energy, which is corresponding to the shape of the sample, vs. detection efficiency, a step of performing the TCS correction using the derived single function has been proposed. However, in the TCS correction using the single function, it is known that the detection efficiency, acquired after the TCS correction is performed, becomes higher than an original detection efficiency.

A result of the method is a fact which is confirmed by a proficiency test (UNNO, et. al., Radioisotopes, Vol. 65, No. 4, p. 181-190, YUNOKI, et. al., radioactivity measurement proficiency test performed on brown rice sample containing radioactive cesium to which uncertainty evaluation is adopted, NMIJ2015 result presentation) which is done in the past. The fact suggests that the TCS correction, in which a gamma-ray occurrence location is taken into consideration, is important.

Meanwhile, the energy indicates energies of the respective measurement target gamma-rays. The detection efficiency is a detection efficiency of each of the measurement target gamma-rays.

Where, as a method for performing the TCS correction by taking occurrence locations of the two or more gamma-rays having the possibility that the TCS effect is generated, a method for deeming a column-shape sample as a set of minute disk (minute and thick column) samples and calculating a detection efficiency, acquired after the TCS correction is completely performed on the column-shape sample, based on a detection efficiency, acquired after the TCS correction is completely performed on a part of the minute disk sample, is introduced in Japanese Patent Application No. 2016-038232.

However, it is difficult to apply the method to the sample (for example, a Marinelli-shaped sample or the like) which has a shape other than the column shape.

Meanwhile, it is possible to realize the TCS correction in which the gamma-ray occurrence location is taken into consideration using Monte-Carlo simulation. However, in the method, it is necessary to perform the Monte-Carlo simulation whenever a detection condition used to detect the measurement target gamma-rays is changed and time which is necessary to perform the TCS correction is long, thereby being not realistic. The problems are found in the above-described proficiency test.

Where, the measurement system 1 calculates the detection efficiency as a similar area detection efficiency based on a result of detection performed by the gamma-ray detection unit 10 for the first container MB1. Where, the first container MB1 is a container which has a shape surrounding at least a part of the gamma-ray detection unit 10. The detection efficiency is an efficiency which detected by the gamma-ray detection unit 10, of the gamma-rays emitted from the sample RA included in a plurality of similar areas. The similar areas are acquired through division performed on the area inside the first container MB1.

In addition, the measurement system 1 calculates the TCS correction coefficient used to correct each of the calculated similar area detection efficiencies.

Hereinafter, for convenience of explanation, the TCS correction coefficient used to correct a certain similar area detection efficiency is referred to as the TCS correction coefficient of the similar area detection efficiency, and is described.

The measurement system 1 calculates, for each of the calculated similar area detection efficiencies, a post-correction similar area detection efficiency for each of the plurality of similar areas by multiplying the TCS correction coefficient of the similar area detection efficiency by the similar area detection efficiency. The post-correction similar area detection efficiency indicates the similar area detection efficiency acquired after the TCS correction is performed. That is, in the example, the TCS correction, which is performed with respect to a certain similar area detection efficiency, indicates calculation of the post-correction similar area detection efficiency which is calculated by multiplying the TCS correction coefficient of the similar area detection efficiency by the similar area detection efficiency.

With the post-correction similar area detection efficiency which is calculated as described above, the measurement system 1 is capable of accurately calculating the detection efficiency of the measurement target gamma-rays emitted from the sample RA stuffed into the first container MB1.

As a result, the measurement system 1 is capable of accurately calculating the detection efficiency, which is detected by the gamma-ray detection unit 10, of the gamma-rays emitted from the sample RA, stuffed into the first container MB1, based on the calculated similar area detection efficiency without performing the Monte-Carlo simulation.

Hereinafter, a configuration of the measurement system 1 will be described in detail. In addition, hereinafter, among processes performed by the control apparatus 30, a process of calculating the detection efficiency of two or more measurement target gamma-rays having the possibility that the TCS effect is generated will be described in detail.

Meanwhile, in the embodiment, a case where a certain area X1 is a similar shape to another area X2 means a case where the area X2 has the same shape as the area X1.

For example, in a case where a shape of the sample RA, stuffed into the Marinelli container having a volume of 0.7 liters, is the shape of the area X1 and a shape of the sample RA, stuffed into the Marinelli container having a volume of 1 liter, is the shape of the area X2, the area X1 has the similar shape to the area X2 in the embodiment. Therefore, a case where the area X1 has the similar shape to the area X2 does not mean a case where the shape of the area X1 and the shape of the area X2 have a geometrically similar shape relationship.

<Configuration of Measurement System>

Hereinafter, a configuration of the measurement system 1 will be described. As described above, the measurement system 1 includes the gamma-ray detection unit 10, the pulse height analysis apparatus 20, the control apparatus 30, and the shielding body BK.

The gamma-ray detection unit 10 is a semiconductor detector capable of detecting gamma-rays. For example, the gamma-ray detection unit 10 is a high-purity germanium semiconductor detector (HPGe detector). Meanwhile, the gamma-ray detection unit 10 may be another detector, such as a scintillation detector or a Geiger counter, if the detector is capable of detecting at least gamma-rays, In addition, the gamma-ray detection unit 10 includes an end cap EC which accommodates a detection element GC (for example, see FIG. 2) that detects incident gamma-rays inside. In the example, the detection element GC is an element according to a type of gamma-ray detection unit 10, and is an element which includes a germanium crystal in the example.

In a case where the detection element GC, which is accommodated inside the end cap EC, and a certain gamma-ray cause interaction, the gamma-ray detection unit 10 detects the gamma-ray. The gamma-ray detection unit 10 outputs a signal, which indicates the detected gamma-rays, to the pulse height analysis apparatus 20.

Where, a pulse height value of the signal indicates energies of the gamma-rays detected by the gamma-ray detection unit 10. Meanwhile, the energies of the gamma-rays detected by the gamma-ray detection unit 10 are energies of gamma-rays absorbed into the gamma-ray detection unit 10. Therefore, the energies of the gamma-rays detected by the detection unit 10 may not be the same compared with the energies which are emitted from the sample RA.

It is possible to attach the first container MB1, into which the sample RA is stuffed, to the end cap EC of the gamma-ray detection unit 10. In a case where the first container MB1 is attached to the end cap EC, the first container MB1 surrounds at least a part of the end cap EC. That is, a shape of the first container MB1 is a shape which surrounds at least a part of the gamma-ray detection unit 10 in this case.

More specifically, in this case, the first container MB1 surrounds, for example, a part, which includes the detection element GC, of a part included in the end cap EC. Hereinafter, a case where the first container MB1 is a Marinelli container will be described, as an example.

Meanwhile, the first container MB1 may be any container, which has a shape that surrounds at least a part of the end cap EC, instead of the Marinelli container. In addition, the part may be configured to include a part of the detection element GC.

Where, the first container MB1 will be described.

In the example, the first container MB1 is a container which has a volume (capacity) of 2 liters. The volume of the first container MB1 is a volume of an area inside the first container MB1. In addition, the sample RA corresponding to 2 liters is stuffed into the first container MB1.

Meanwhile, in contrast, the volume of the first container MB1 may be configured to be smaller than 2 liters or may be configured to be larger than 2 liters.

Figure 2:
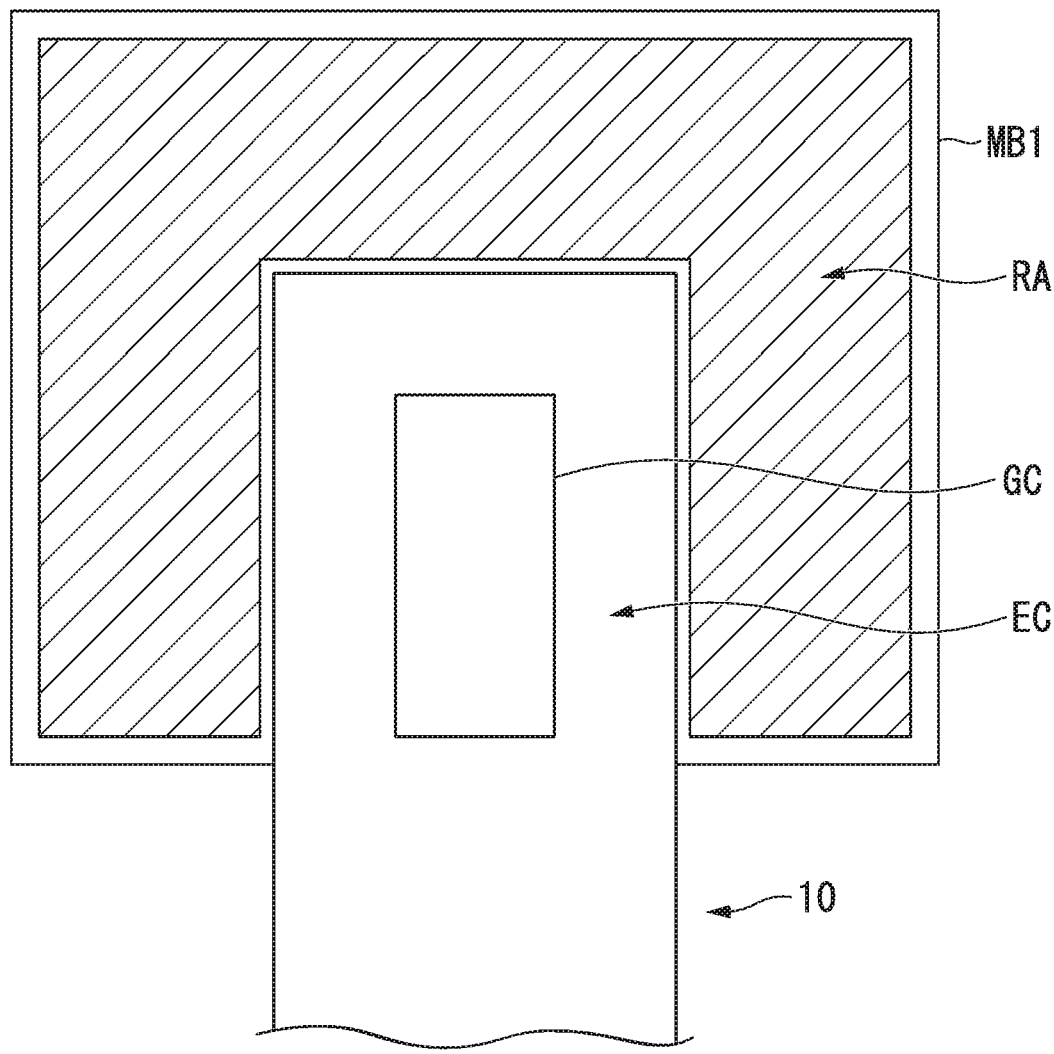
FIG. 2 is a diagram illustrating an example of a first container MB1 attached to the gamma-ray detection unit 10.

FIG. 2 is a diagram illustrating an example of the first container MB1 attached to the gamma-ray detection unit 10. In addition, FIG. 2 is a sectional diagram illustrating a case where the first container MB1 and the gamma-ray detection unit 10 are cut by a plane which is parallel to a central axis of the end cap EC of the gamma-ray detection unit 10.

As illustrated in FIG. 2, the sample RA is stuffed into the first container MB1. As illustrated in FIG. 2, the first container MB1 in the example is the Marinelli container. Therefore, at least a part of the end cap EC (that is, the part which includes the detection element GC among a part of the gamma-ray detection unit 10) is surrounded by the first container MB1.

Returning to FIG. 1.

In the example illustrated in FIG. 1, the gamma-ray detection unit 10 and the sample RA are surrounded by the shielding body BK. The shielding body BK shields incidence of gamma-rays (that is, gamma-rays from the outside) other than the gamma-rays emitted from the sample RA on the gamma-ray detection unit 10. In addition, the shielding body BK shields gamma-rays emitted from the sample RA toward the outside. The shielding body BK is formed of, for example, lead.

Meanwhile, the shielding body BK may be configured to be formed of another substance, such as water, instead of lead. At least a part of the gamma-ray detection unit 10 may be configured to be not surrounded by the shielding body BK. The measurement system 1 may be configured to not include the shielding body BK.

The gamma-ray detection unit 10 is connected to each of the pulse height analysis apparatus 20 and the control apparatus 30 via a cable such that communication is possible. Wired communication via the cable is performed in conformity with, for example, standards such as the Internet (registered trademark) and a Universal Serial Bus (USB).

Meanwhile, the gamma-ray detection unit 10 may be configured to be connected to any one or both of the pulse height analysis apparatus 20 and the control apparatus 30 through wireless communication which is performed in conformity with a communication standard such as Wi-Fi (registered trademark).

The pulse height analysis apparatus 20 is, for example, a multi-channel analyzer. The pulse height analysis apparatus 20 acquires a signal, which indicates the gamma-rays detected by the gamma-ray detection unit 10, from the gamma-ray detection unit 10. The pulse height analysis apparatus 20 performs analysis on a pulse height of the acquired signal, that is, calculates a count value for each of a plurality of channels which are set according to the pulse height value. For example, in a case where a signal, which has a pulse height value according to energies of the gamma-rays emitted from the sample RA, is acquired from the gamma-ray detection unit 10, the pulse height analysis apparatus 20 generates the above-described spectrum as pulse height distribution of the acquired signal.

Meanwhile, the pulse height analysis apparatus 20 may be another analysis apparatus which calculates a count based on a signal which indicates the gamma-rays detected by the gamma-ray detection unit 10 such as a single channel analyzer.

The pulse height analysis apparatus 20 is connected to the control apparatus 30 via the cable such that communication is possible. Wired communication via the cable is performed in conformity with, for example, a standard such as the Ethernet (registered trademark) or the USB.

Meanwhile, the pulse height analysis apparatus 20 may be configured to be connected to the control apparatus 30 through the wireless communication which is performed in conformity with a communication standard such as Wi-Fi (registered trademark).

The control apparatus 30 is, for example, a workstation, a desktop Personal Computer (PC), a note PC, a tablet PC, a multi-functional mobile telephone (smart phone), a Personal Digital Assistant (PDA), or the like.

The control apparatus 30 acquires spectrum information, which indicates the spectrum generated by the pulse height analysis apparatus 20, from the pulse height analysis apparatus 20. The control apparatus 30 analyzes the measurement target nuclide among the radioactive nuclides, which are included in the sample RA, based on the spectrum indicated by the acquired spectrum information.

Specifically, the control apparatus 30 calculates, for example, the detection efficiency of the measurement target gamma-rays emitted from the measurement target nuclide. The control apparatus 30 performs the TCS correction on the calculated detection efficiency. The control apparatus 30 calculates a count of the measurement target gamma-rays based on the detection efficiency acquired after the TCS correction is performed. The control apparatus 30 calculates the radioactivity of the measurement target nuclide based on the calculated count.

Meanwhile, the control apparatus 30 may have a configuration in which another process is performed as the analysis.

<Hardware Configuration of Control Apparatus>

Figure 3:
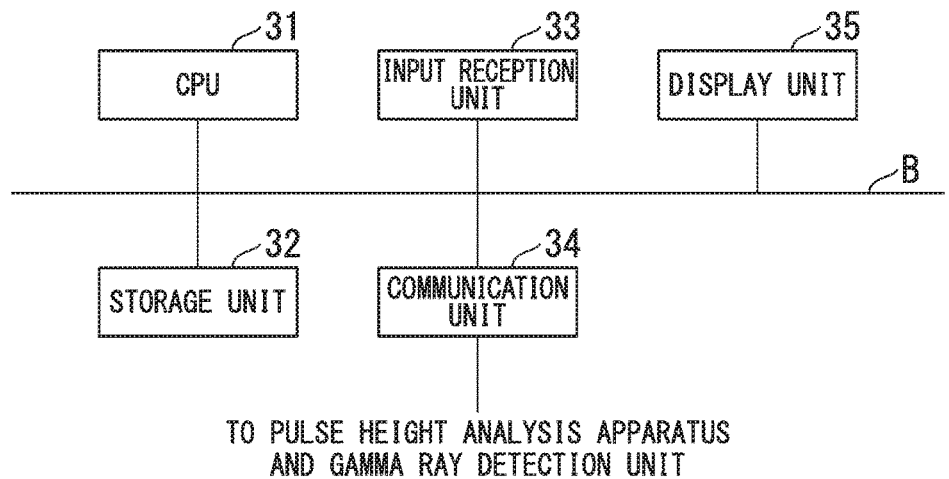
FIG. 3 is a diagram illustrating an example of a hardware configuration of a control apparatus 30.

Hereinafter, a hardware configuration of the control apparatus 30 will be described with reference to FIG. 3. FIG. 3 is a diagram illustrating an example of the hardware configuration of the control apparatus 30.

The control apparatus 30 includes, for example, a Central Processing Unit (CPU) 31, a storage unit 32, an input reception unit 33, a communication unit 34, and a display unit 35. The components are connected to each other through a bus B such that mutual communication is possible. The control apparatus 30 performs communication with each of the gamma-ray detection unit 10 and the pulse height analysis apparatus 20 through the communication unit 34.

The CPU 31 executes various programs stored in the storage unit 32.

The storage unit 32 includes, for example, a Hard Disk Drive (HDD), a Solid State Drive (SSD), an Electrically Erasable Programmable Read-Only Memory (EEPROM), a Read-Only Memory (ROM), a Random Access Memory (RAM), or the like.

Meanwhile, the storage unit 32 may be an external storage device which is connected by a digital input/output port, such as a USB, or the like instead of a storage unit which is built in the control apparatus 30. The storage unit 32 stores various pieces of information, images, and programs to which are processed by the control apparatus 30.

The input reception unit 33 includes, for example, a keyboard, a mouse, a touch pad, and other input devices. Meanwhile, the input reception unit 33 may be a touch panel which is integrally configured with the display unit 35.

The communication unit 34 is configured to include, for example, a digital input/output port, such as a USB, an Ethernet (registered trademark) port, and the like.

The display unit 35 includes, for example, a liquid crystal display panel or an organic Electro-Luminescence (EL) display panel.

<Functional Configuration of Control Apparatus>

Figure 4:
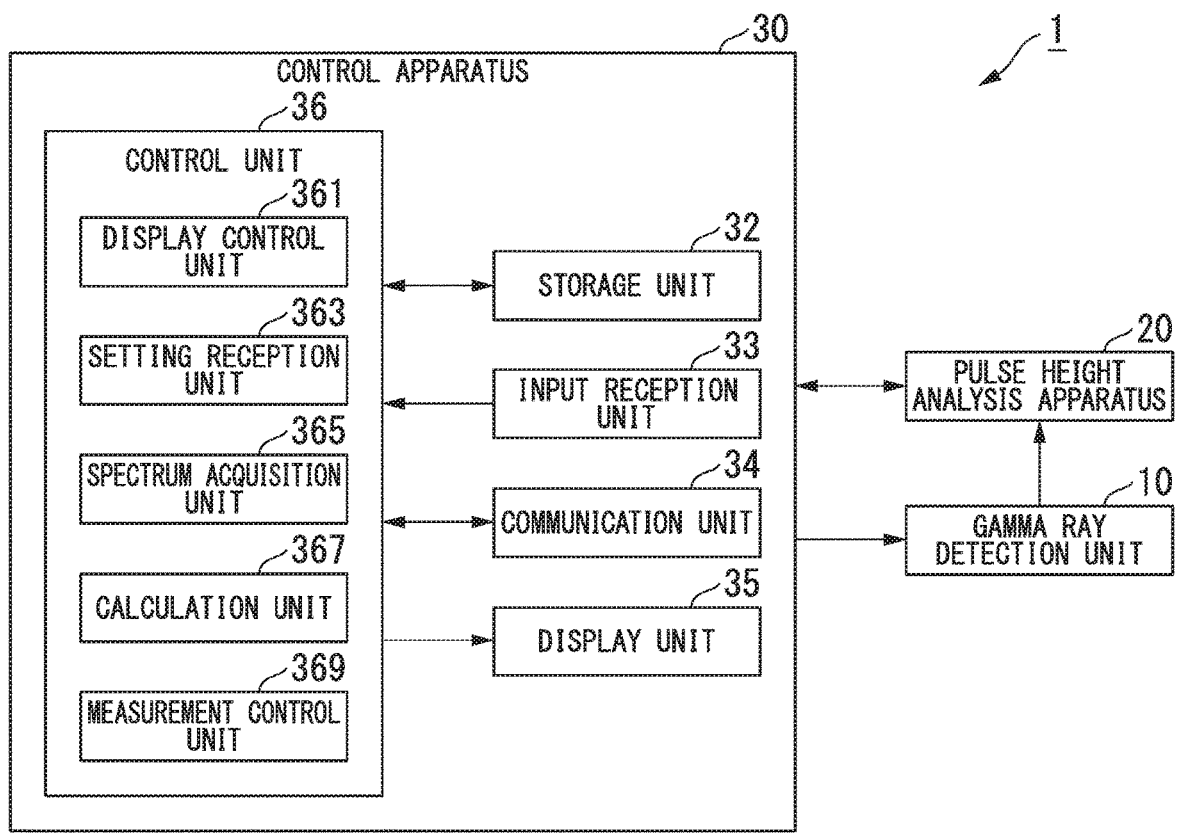
FIG. 4 is a diagram illustrating an example of a functional configuration of the control apparatus 30.

Hereinafter, a functional configuration of the control apparatus 30 will be described with reference to FIG. 4. FIG. 4 is a diagram illustrating an example of the functional configuration of the control apparatus 30.

The control apparatus 30 includes a storage unit 32, an input reception unit 33, a communication unit 34, a display unit 35, and a control unit 36.

The control unit 36 controls the whole control apparatus 30. The control unit 36 includes a display control unit 361, a setting reception unit 363, a spectrum acquisition unit 365, a calculation unit 367, and a measurement control unit 369. The functional units included in the control unit 36 are realized, for example, in such a way that the above-described CPU executes the various programs stored in the storage unit 32. In addition, a part or an entirety of the functional units may be hardware functional units such as a Large Scale Integration (LSI) and an Application Specific Integrated Circuit (ASIC).

The display control unit 361 generates various screens including an operation screen used for the control apparatus 30 to receive an operation from a user based on the operation received from the user. The display control unit 361 causes the display unit 35 to display the generated various screens.

The setting reception unit 363 receives various settings, which are set to the respective functional units included in the control unit 36, through at least a part screen of the various screens which are displayed by the display control unit 361 on the display unit 35.

The spectrum acquisition unit 365 acquires the spectrum information, which indicates the spectrum calculated by the pulse height analysis apparatus 20, from the pulse height analysis apparatus 20. The spectrum acquisition unit 365 converts bins, which are a plurality of bins included in the spectrum indicated by the acquired information and which indicates the plurality of respective channels, into bins, which indicate the energy, based on information which is previously stored by the user and which corresponds to correspondence relation information that indicates a correspondence relation between each of the plurality of channels, included in the pulse height analysis apparatus 20, and energy.

Meanwhile, hereinafter, for convenience of explanation, a bins conversion process performed by the spectrum acquisition unit 365 is not described.

The calculation unit 367 calculates the detection efficiency of the measurement target gamma-rays emitted from the measurement target nuclides using the spectrum indicated by the spectrum information acquired by the spectrum acquisition unit 365. The calculation unit 367 reads information, which is previously stored in the storage unit 32 and indicates various detection efficiencies, from the storage unit 32. The calculation unit 367 performs the TCS correction with respect to the calculated detection efficiency or performs the TCS correction with respect to the detection efficiency which is read from the storage unit 32. The calculation unit 367 performs various processes based on the detection efficiency after the TCS correction is performed.

The measurement control unit 369 controls the pulse height analysis apparatus 20, and causes the pulse height analysis apparatus 20 to start or end calculation of the spectrum.

<First Detailed Example of Process of Calculating Detection Efficiency of Two or More Measurement Target Gamma-Rays Having Possibility that TCS Effect is Generated>

Hereinafter, a first detailed example of a process of the control apparatus 30 calculating the detection efficiency of two or more measurement target gamma-rays, which cause the TCS effect to be generated, will be described with reference to FIG. 5.

In the first detailed example, in a case where the control apparatus 30 calculates the detection efficiency of the measurement target gamma-rays emitted from the sample RA in the first container MB1, the detection efficiency being acquired after the TCS correction is performed, the control apparatus 30 calculates the similar area detection efficiency for each of the plurality of similar areas, which are acquired through division performed on the area inside the first container MB1, based on the first reference information.

That is, in the first detailed example, the control apparatus 30 calculates the similar area detection efficiency for each of the plurality of similar areas, which are acquired through division performed on the area inside the first container MB1, based on the first reference information, and calculates the detection efficiency of the measurement target gamma-rays emitted from the sample RA in the first container MB1 based on the calculated similar area detection efficiency. Furthermore, the control apparatus 30 performs the TCS correction on the calculated detection efficiency, and calculates the detection efficiency acquired after the TCS correction is performed.

The first reference information is information which, are associated with a plurality of second container information and a first reference detection efficiency information. The plurality of the second container information respectively indicates each of the second containers, into which the sample RA is stuffed, having similar shapes to the first container MB1. The first reference detection efficiency information is indicates the first reference detection efficiency corresponding to the detection efficiency of the gamma-rays emitted from the sample RA in the second container and corresponding to the detection efficiency of each of the gamma-rays having energies different from each other.

That is, the first reference information is information in which, for each of the plurality of second containers, second container information that indicates the second container is associated with the first reference detection efficiency information that indicates the detection efficiency, which is detected by the gamma-ray detection unit 10, for each of the gamma-rays having energies different from each other among the gamma-rays emitted from the sample RA in the second container.

Where, the second container information, which indicates a certain second container, is information which indicates a volume of the certain second container in the example. In addition, each of the plurality of second containers is a container which has a volume that is equal to or smaller than the volume of the first container MB1 in the example.

Hereinafter, a case will be described where the plurality of second containers includes only three second containers, that is, a 21-st container which is a second container having a volume of 0.7 liters, a 22-nd container which is a second container having a volume of 1 liter, and a 23-rd container which is a second container having a volume of 2 liters, as an example. Meanwhile, the second container information, which indicates the certain second container, may be another information, which indicates the certain second container, instead of the volume. In addition, a configuration, in which the plurality of second containers include another second container instead of a part or an entirety of the 21-st container, the 22-nd container, and the 23-rd container, or a configuration, in which another second container is included in addition to a part or an entirety of the 21-st container, the 22-nd container, and the 23-rd container, may be provided.

Figure 5:
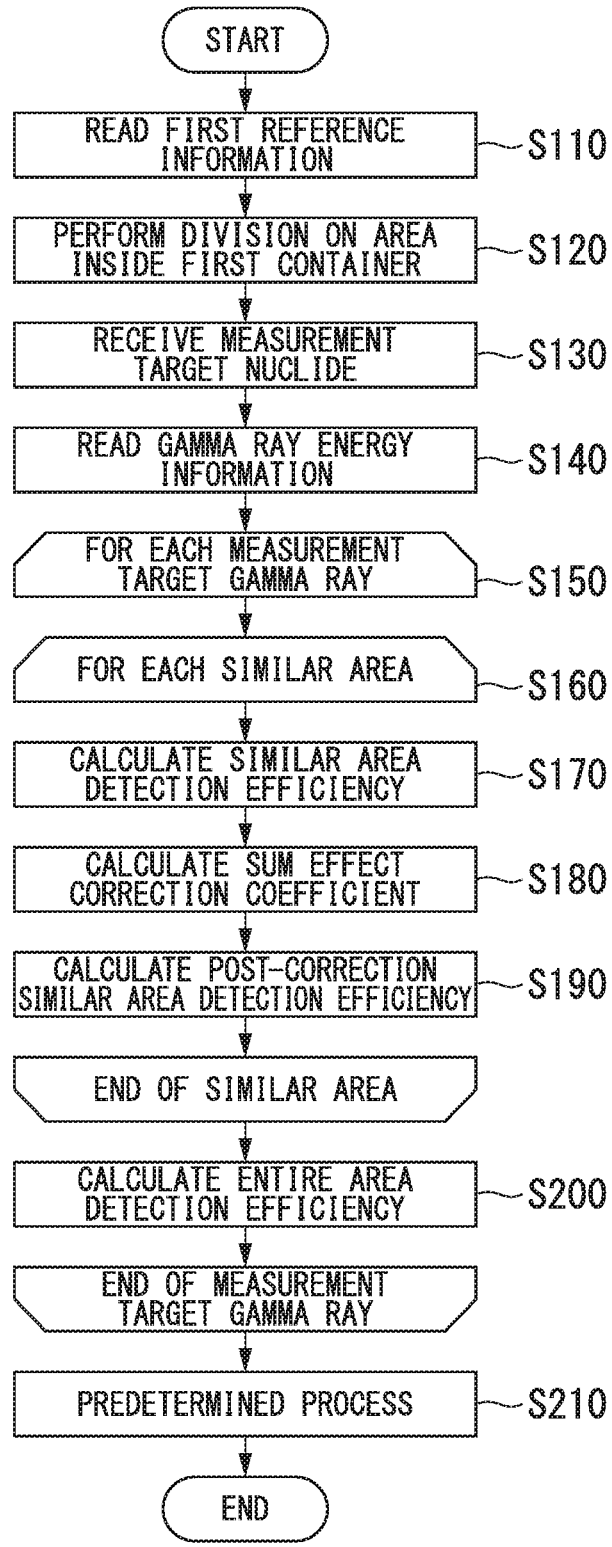
FIG. 5 is a flowchart illustrating an example of a flow of a process of the control apparatus 30 calculating a detection efficiency, which is detected by the gamma-ray detection unit 10, of two or more gamma-rays which cause a TCS effect to be generated.

FIG. 5 is a flowchart illustrating an example of a flow of a process of the control apparatus 30 calculating the detection efficiency, which is detected by the gamma-ray detection unit 10, of two or more gamma-rays which cause the TCS effect to be generated.

Meanwhile, in the flowchart illustrated in FIG. 5, a case will be described where the control apparatus 30 already receives an operation of starting the process from the user at timing before a process of step S110 starts. In addition, in the flowchart, a case will be described where the spectrum information according to the first container MB1 is already stored in the storage unit 32 at the timing. The spectrum information according to the first container MB1 is information which indicates the spectrum of the gamma-rays detected by the gamma-ray detection unit 10 in a case where the first container MB1, into which the sample RA is stuffed, is attached to the gamma-ray detection unit 10, the spectrum of the gamma-rays being emitted from the sample RA in the first container MB1.

That is, in the flowchart, a case will be described where, for the gamma-rays emitted from the sample RA in the first container MB1, the measurement system 1 already finishes detection, which is performed by the gamma-ray detection unit 10, of the gamma-rays, generation, which is performed by the pulse height analysis apparatus 20, of the spectrum based on the signal which indicates the gamma-rays detected by the gamma-ray detection unit 10, and storage of the spectrum information, which indicates the spectrum, in the storage unit 32 at the timing.

The calculation unit 367 reads the first reference information, which is previously stored in the storage unit 32, from the storage unit 32 (step S110).

Where, the control apparatus 30 may be configured such that the first reference information generated by another apparatus is previously stored in the storage unit 32 by the user. In addition, the control apparatus 30 may be configured to generate the first reference information and to store the generated first reference information in the storage unit 32. In this case, the control apparatus 30 calculates, for each of the three second containers (that is, the 21-st container, the 22-nd container, and the 23-rd container) into which the sample RA is stuffed, the detection efficiency of each of the gamma-rays, which are emitted from the sample RA in the second container and which have energies different from each other, based on a result of detection, performed by the gamma-ray detection unit 10 to which the second container is attached, of the gamma-rays. Furthermore, the control apparatus 30 generates the first reference information based on the detection efficiency calculated for each of the three second containers. Meanwhile, in this case, the control apparatus 30 may be configured to generate the first reference information using another method. In this case, the second container may be configured such that a radioactivity standard is stuffed instead of the sample RA. A configuration in which the first container MB1 is used for instead of the second container (in the example, the 23-rd container), which has the largest volume, among the three second containers, may be provided and a configuration in which a container different from the first container MB1 is used for instead of the second container (in the example, the 23-rd container), which has the largest volume, among the three second containers, may be provided.

Subsequently, the calculation unit 367 reads a container shape information from the storage unit 32. The container shape information which is previously stored in the storage unit 32, indicates the shape of the first container MB1 and shapes of the respective three second containers (that is, the 21-st container, the 22-nd container, and the 23-rd container) corresponding to the plurality of second containers in the example. The calculation unit 367 divides the area inside the first container MB1 into a plurality of similar areas which is area similar in shape to each other, based on the read container shape information and each areas inside the three second containers (that is, the 21-st container, the 22-nd container, and the 23-rd container) corresponding to the plurality of second containers in the example (step S120).

Where, the process of step S120 will be described.

In a case where a certain second container is attached to the gamma-ray detection unit 10 in a detection unit fixing state in which a location of the gamma-ray detection unit 10 is fixed to a predetermined location such that the gamma-ray detection unit 10 does not move, the second containers have a similar in shape to the first container MB1. Therefore, each of the areas inside the second containers has similar shape area to the area inside the first container MB1. And, each of the areas inside the second containers overlap at least a part of the area inside the first container MB1 attached to the gamma-ray detection unit 10 in the detection unit fixing state. With this, the calculation unit 367 extracts all the second container information (in the example, the second container information which indicates each of the three second containers) which are extracted without being duplicated with each other from the second container information included in the read first reference information, and divides the area inside the first container MB1 into a plurality of similar areas using areas inside the second containers which are indicated by the respective pieces of extracted second container information.

Meanwhile, the location of the gamma-ray detection unit 10 is represented, for example, by a location of center of mass of the gamma-ray detection unit 10. However, instead, a configuration in which the location of the gamma-ray detection unit 10 is represented by another location based on the gamma-ray detection unit 10 may be provided.

More specifically, the calculation unit 367 divides the area inside the first container MB1 into three similar areas, that is, a first similar area, a second similar area, and a third similar area which will be described below, using the areas inside the respective containers, that is, the 21-st container, the 22-nd container, and the 23-rd container corresponding to the second containers respectively indicated by the extracted second container information.

The first similar area is an area, which overlaps a 21-st container area, in the first container area. The first container area is the area inside the first container MB1 in a case where the first container MB1 is attached to the gamma-ray detection unit 10 in the detection unit fixing state. The 21-st container area is the area inside the 21-st container in a case where the 21-st container is attached to the gamma-ray detection unit 10 in the detection unit fixing state. In addition, the 21-st container area is an area which has a volume of 0.7 liters. Meanwhile, it is possible to restate the first similar area is an area which overlaps the 21-st container area and does not overlap a 20-th container area in a case where it refer to a virtual container which has a volume of 0 liter and having a similar shape to the first container as the 20-th container, The 20-th container area is an area inside the 20-th container in a case where the 20-th container is attached to the gamma-ray detection unit 10 in the detection unit fixing state, and is an area which has a volume of 0 liter.

Where, each of the 20-th container and the 20-th container area will be used for convenience in order to clear the description for the process of step S170 which will be described later.

The second similar area is an area, which overlaps a 22-nd container area and does not overlap the 21-st container area, in the first container area. The 22-nd container area is an area inside the 22-nd container in a case where the 22-nd container is attached to the gamma-ray detection unit 10 in the detection unit fixing state.

The third similar area is an area, which overlaps a 23-rd container area and does not overlap the 21-st container area and the 22-nd container area, in the first container area. The 23-rd container area is an area inside the 23-rd container in a case where the 23-rd container is attached to the gamma-ray detection unit 10 in the detection unit fixing state.

That is, the calculation unit 367 specifies the area, which overlaps the 21-st container area and does not overlap the 20-th container area, in the first container area as the first similar area. In addition, the calculation unit 367 specifies the area, which overlaps the 22-nd container area and does not overlap the 21-st container area, in the first container area as the second similar area. In addition, the calculation unit 367 specifies the area, which overlaps the 23-rd container area and does not overlap the 22-nd container area, in the first container area as the third similar area.

Furthermore, the calculation unit 367 divides the first container area into the three specified similar areas, that is, the first similar area, the second similar area, and the third similar area.

Where, the respective first to third similar areas will be described with reference to FIGS. 6 and 7.

Figure 6:
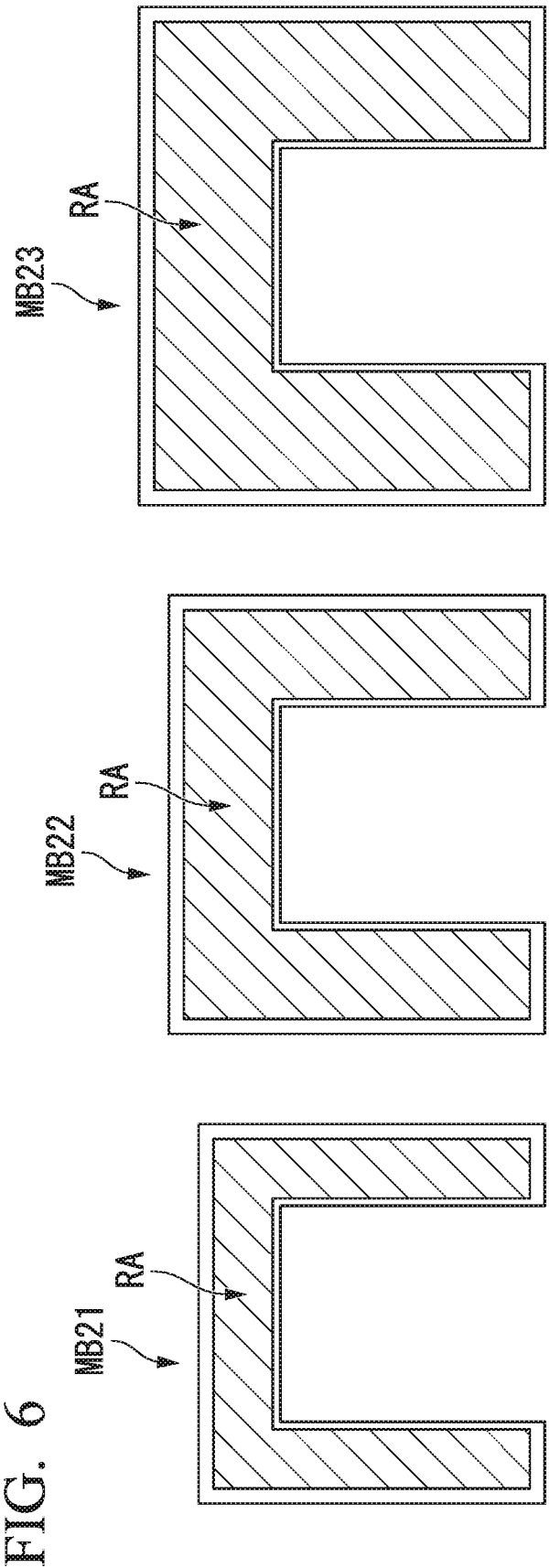
FIG. 6 is a diagram illustrating respective examples of a 21-st container, a 22-nd container, and a 23-rd container.

FIG. 6 is a diagram illustrating respective examples of the 21-st container, the 22-nd container, and the 23-rd container. A container MB21 illustrated in FIG. 6 is an example of the 21-st container, and is a Marinelli container which has a volume of 0.7 liters. A container MB22 illustrated in FIG. 6 is an example of the 22-nd container and is a Marinelli container which has a volume of 1 liter. A container MB23 illustrated in FIG. 6 is an example of the 23-rd container and is a Marinelli container which has a volume of 2 liters.

As described above, each of the containers MB21 to MB23 has a similar shape to the first container MB1. Meanwhile, the container MB23 may be the first container MB1.

Figure 7:
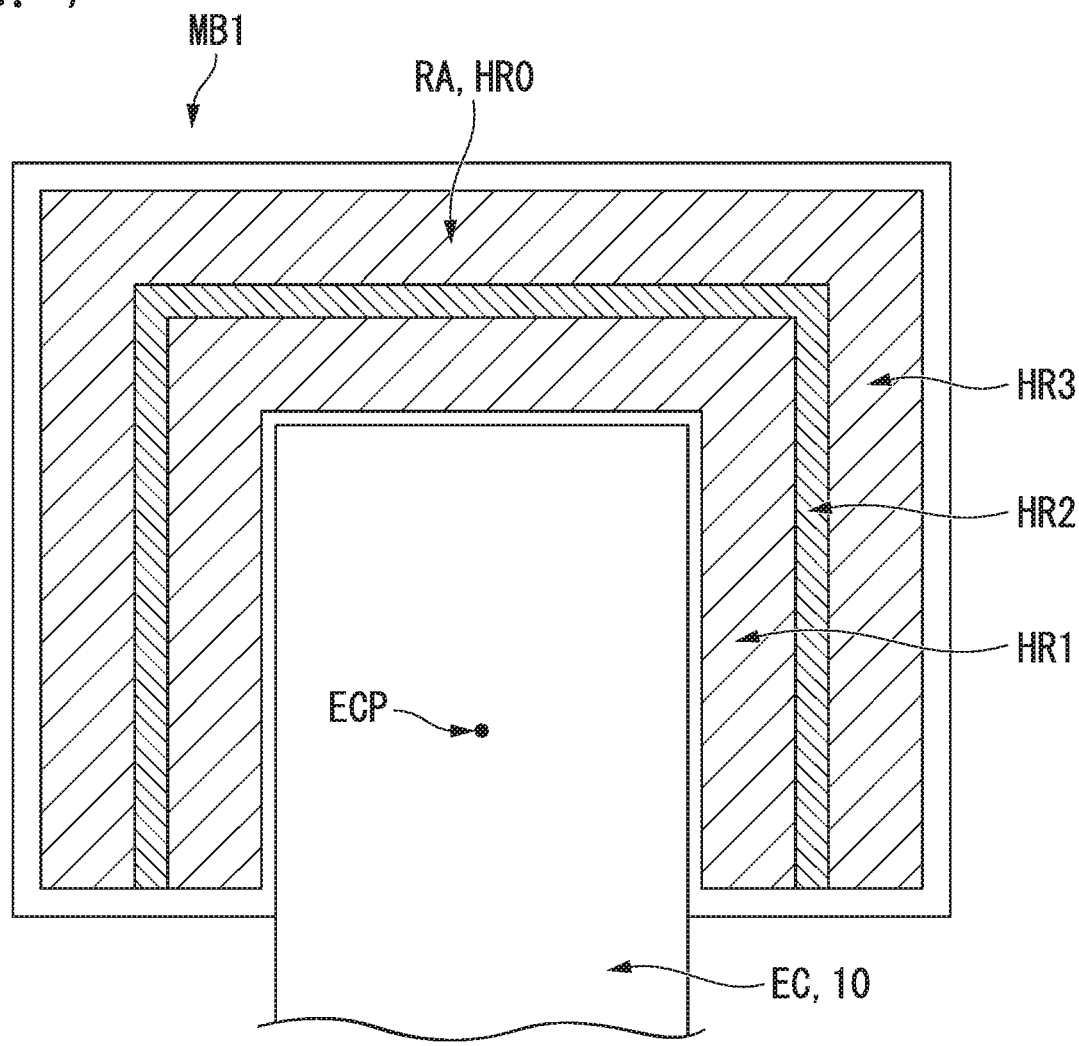
FIG. 7 is a diagram illustrating respective examples of first to third similar areas.

FIG. 7 is a diagram illustrating respective examples of the first to third similar areas.

A point ECP illustrated in FIG. 7 indicates an effective center of the gamma-ray detection unit 10. An area HR1 illustrated in FIG. 7 is an example of the area which overlaps the 21-st container area in the first container area and does not overlap the 20-th container area (since the volume in the container is 0 liter, not illustrated in FIG. 7), that is, an example of the first similar area. In addition, an area, combined the area HR1 with an area HR2 illustrated in FIG. 7, is the example of an area which overlaps the 22-nd container area in the first container area. That is, the area HR2 is an area, which overlaps the 22-nd container area in the first container area and does not overlap the 21-st container area, that is, an example of the second similar area. An area HR0, which is an area combined the area HR1, the area HR2, and an area HR3 illustrated in FIG. 7, is an example of an area which overlaps the 23-rd container area in the first container area, that is, the first container area in the example. That is, the area HR3 is an area which overlaps the 23-rd container area in the first container area and does not overlap the 21-st container area and the 22-nd container area, that is, an example of the third similar area. As illustrated in FIG. 7, each of the first to third similar areas has a similar shape to the first container area.

Where, as illustrated in FIG. 7, a deviation of a distance between the effective center indicated by the point ECP and each location in the area HR1, a deviation of a distance between the effective center indicated by the point ECP and each location in the area HR2, and a deviation of a distance between the effective center indicated by the point ECP and each location in the area HR3 are respectively smaller than a deviation of a distance between the effective center indicated by the point ECP and each location in the first container area (that is, the area HR0).

From this, the control apparatus 30 calculates the similar area detection efficiencies for the respective areas HR1, HR2, and HR3 which are three similar areas. Furthermore, the control apparatus 30 calculates the TCS correction coefficients of the respective calculated similar area detection efficiencies. The control apparatus 30 calculates, for the similar area detection efficiencies, post-correction similar area detection efficiencies for the respective areas HR1, HR2, and HR3 by multiplying the respective calculated similar area detection efficiencies by the TCS correction coefficients of the similar area detection efficiencies.

Therefore, the control apparatus 30 is capable of accurately calculating the detection efficiency, detected by the gamma-ray detection unit 10, of the gamma-rays emitted from the sample RA included in the first container area. As a result, the control apparatus 30 is capable of accurately calculating, for example, the radioactivity of the measurement target nuclide included in the sample RA.

Returning to FIG. 5.

The calculation unit 367 divides the first container area into three similar areas, that is, the first similar area, the second similar area, and the third similar area, based on the respective 20-th to 23-rd container areas. Here, a volume of the first similar area corresponds to a volume of the area which overlaps the 21-st container area in the first container area and does not overlap the 20-th container area. Therefore, the volume of the first similar area is the same as the volume of the 21-st container, that is, 0.7 liters. A volume of the second similar area corresponds to a volume of the area which overlaps the 22-nd container area in the first container area and does not overlap the 21-st container area. Therefore, the volume of the second similar area is the same as the volume acquired by subtracting the volume of the 21-st container area from a volume of the 22-nd container area, that is, 0.3 liters. A volume of the third similar area is a volume of the area which overlaps the 23-rd container area in the first container area and does not overlap the 21-st container area and the 22-nd container area. Therefore, the volume of the third similar area is the same as a volume acquired by subtracting the volumes of the 21-st container area and the 22-nd container area from the volume of the 23-rd container area, that is, 1 liter. As described above, the calculation unit 367 is capable of dividing the first container area into the three similar areas, that is, the first similar area, the second similar area, and the third similar area based on the areas inside the respective three second containers (that is, the 21-st container, the 22-nd container, and the 23-rd container) corresponding to the plurality of second containers in the example.

Meanwhile, the calculation unit 367 may be configured to divide the first container area into a plurality of similar areas using another method based on the areas inside the respective three second containers (that is, the 21-st container, the 22-nd container, and the 23-rd container) corresponding to the plurality of second containers in the example, may be configured to divide the first container area into four or more similar areas based on the areas, or may be configured to divide the first container area into two similar areas based on the areas.

After the process of step S120 is performed, the calculation unit 367 receives measurement target nuclide information, which indicates the measurement target nuclide, from the user (step S130). For example, the calculation unit 367 receives the measurement target nuclide information, which indicates the above-described measurement target nuclide, from the user through an operation screen which is displayed on the display unit 35 by the display control unit 361. The operation screen is a screen used for the control apparatus 30 to receive various operations from the user.

Subsequently, the calculation unit 367 reads gamma-ray energy information which is previously stored in the storage unit 32 (step S140).

The gamma-ray energy information is information, in which, for each radioactive nuclide information which indicate each of the plurality of radioactive nuclides, radioactive nuclide information is associated with pieces of information that indicates respective energies of two or more gamma-rays having the possibility that the TCS effect is generated among the gamma-rays emitted in disintegration of the radioactive nuclide indicated by the radioactive nuclide information. The calculation unit 367 extracts information, which is associated with the radioactive nuclide information that indicates measurement target nuclide indicated by the measurement target nuclide information received from the user in a process of step S130 and which indicates the energy of each of the two or more gamma-rays, as information, which indicates each of the measurement target gamma-rays, with reference to the read gamma-rays energy information. For example, in a case where the measurement target nuclide is cobalt 60, pieces of information, which indicate the measurement target gamma-rays extracted by the calculation unit 367 in step S140, correspond to information which indicates 1173 keV and information which indicates 1332 keV, respectively.

Subsequently, the calculation unit 367 selects the pieces of information which indicate two or more measurement target gamma-rays and which are selected in step S140 one by one, and repeatedly performs the processes of steps S160 to S200 for each of the selected pieces of information which indicate measurement target gamma-rays (step S150). That is, the calculation unit 367 repeatedly performs the processes for each of the two or more measurement target gamma-rays having the possibility that the TCS effect is generated among the measurement target gamma-rays emitted from the measurement target nuclide indicated by the measurement target nuclide information received from the user in step S130.

After the pieces of information, which indicate the measurement target gamma-rays, are selected in step S150, the calculation unit 367 repeatedly performs the processes of steps S170 to S190 for each of the three similar areas (that is, first similar area, the second similar area, and the third similar area) which are areas acquired through division performed on the first container area in step S120 (step S160). For example, the calculation unit 367 sequentially (in the example, in order of the first similar area, the second similar area, and the third similar area) selects the three similar areas one by one as the target similar area toward the outside from the inside of the first container area, and repeatedly performs the processes for each of the selected target similar areas. Meanwhile, the calculation unit 367 may be configured to randomly select the target similar area one by one among the three similar areas, may be configured to sequentially select the three similar areas one by one as the target similar area from a large volume side to a small volume side in the area, and may be configured to sequentially select the three similar areas one by one as the target similar area using another method.

After the target similar area is selected in step S160, the calculation unit 367 calculates the similar area detection efficiency for the target similar area selected in step S160 based on the first reference information which is read from the storage unit 32 in step S110 (step S170). Where, the process of step S170 will be described.

The similar area detection efficiency for the target similar area is the detection efficiency, which is detected by the gamma-ray detection unit 10, of the measurement target gamma-rays, which are indicated by the information selected in step S150, among the gamma-rays emitted from the sample RA included in the target similar area of the first container area.

The calculation unit 367 specifies an area, which has a largest volume, in an area existing on an inner side than the target similar area in the first container area among the above-described three areas, that is, the 21-st container area, the 22-nd container area, and the 23-rd container area, as a first reference area. Meanwhile, in a case where the target similar area is a similar area on an innermost side in the first container area among the three similar areas (that is, the first similar area, the second similar area, and the third similar area), the calculation unit 367 specifies the above-described 20-th container area as the first reference area. The calculation unit 367 specifies an area, which has an area having the next largest volume after the first reference area among the three areas, that is, the 21-st container area, the 22-nd container area, and the 23-rd container area, as a second reference area. For example, in a case where the first reference area is the 20-th container area, the calculation unit 367 specifies the 21-st container area as the second reference area. In addition, for example, in a case where the first reference area is the 21-st container area, the calculation unit 367 specifies the 22-nd container area as the second reference area.

The calculation unit 367 refers to the first reference information which is read in step S110, and extracts the first reference detection efficiency information associated with the second container information which indicates the second container having an area corresponding to the first reference area in the detection unit fixing state. Furthermore, the calculation unit 367 specifies the first reference detection efficiency of the measurement target gamma-rays indicated by the information selected in step S150 among the first reference detection efficiencies indicated by the extracted first reference detection efficiency information as an 11-th reference detection efficiency based on the measurement target gamma-rays (in the example, energy) indicated by the information selected in step S150.

Meanwhile, in a case where the first reference area is the 20-th container area, the calculation unit 367 specifies 0 as the 11-th reference detection efficiency.

The calculation unit 367 refers the first reference information read in step S110, and extracts the first reference detection efficiency information associated with the second container information which indicates the second container having an area corresponding to the second reference area in the detection unit fixing state. Furthermore, the calculation unit 367 specifies the first reference detection efficiency of the measurement target gamma-rays, indicated by the information selected in step S150, among the first reference detection efficiencies indicated by the extracted first reference detection efficiency information, as a 12-th reference detection efficiency based on the measurement target gamma-rays (in the example, energies) indicated by the information selected in step S150.

Furthermore, the calculation unit 367 calculates the similar area detection efficiency for the measurement target gamma-rays, indicated by the information selected in step S150, and for the target similar area based on Equation (1) shown below.

$$\varepsilon_x(E) = \frac{V_L}{V_L - V_S}\varepsilon_L(E) - \frac{V_S}{V_L - V_S}\varepsilon_S(E) \qquad (1)$$

Where, "E" indicates energy of the measurement target gamma-rays indicated by the information selected in step S150. "$\varepsilon_x(E)$" indicates the similar area detection efficiency for the measurement target gamma-rays and for the target similar area. "$\varepsilon_S(E)$" indicates the specified 11-th reference detection efficiency. "$\varepsilon_L(E)$" indicates the specified 12-th reference detection efficiency. "$V_S$" indicates the volume of the area inside the first reference container. "$V_L$" indicates the volume of the area inside the second reference container.

As described above, the calculation unit 367 is capable of calculating the similar area detection efficiency for the measurement target gamma-rays, which are indicated by the information selected in step S150, and for the target similar area using the first reference information, which is read from the storage unit 32 in step S110, and the Equation (1).

After the process of step S170 is performed, the calculation unit 367 calculates the TCS correction coefficient of the similar area detection efficiency based on the similar area detection efficiency for the target similar area which is calculated in step S170 (step S180).

More specifically, the calculation unit 367 calculates the TCS correction coefficient using the 12-th reference detection efficiency specified in step S170 and a value acquired by multiplying the 11-th reference detection efficiency specified in step S170 by the 12-th reference detection efficiency based on, for example, methods disclosed in "γ-Ray Spectrometry-Experiment And Practical Training, written by Noguchi Masayasu, Nikkan Kogyo Shimbun, 1980", "Gamma-ray Spectrometry Using a Germanium Semiconductor Detector (2nd Edition)", Radiation Measurement Method Series, No. 7, Ministry of Education, Culture, Sports, Science and Technology—Japan, Jul. 30, 2004", "Practical Gamma-ray Spectroscopy, written by Gordon Gilmore, Wiley, 2011", and the like. Meanwhile, the calculation unit 367 may be configured to calculate the TCS correction coefficient using another method based on the similar area detection efficiency of the target similar area calculated in step S170, and may be configured to calculate the TCS correction coefficient using a method which will be developed from now on. Therefore, hereinafter, the process of step S180 will not be described in further detail.

After the process of step S180 is performed (that is, after the TCS correction coefficient of the similar area detection efficiency for the target similar area is calculated), the calculation unit 367 calculates the post-correction similar area detection efficiency for the target similar area by multiplying the similar area detection efficiency for the target similar area calculated in step S170 by the TCS correction coefficient calculated in step S180 (step S190). Furthermore, the calculation unit 367 transitions to step S160, and selects a subsequent target similar area.

Meanwhile, in a case where a similar area, which is not selected in step S160 as the target similar area, does not exist, the calculation unit 367 transitions to step S200.

After the repetition processes of steps S160 to S190 are performed, the calculation unit 367 calculates the detection efficiency of the measurement target gamma-rays indicated by the information selected in step S150, that is, the detection efficiency, which is detected by the gamma-ray detection unit 10, of the measurement target gamma-rays emitted from the sample RA included in the first container area as an entire area detection efficiency based on a plurality of post-correction similar area detection efficiencies repeatedly calculated in step S190 of the repetition process (step S200). Specifically, the calculation unit 367 calculates the entire area detection efficiency based on Equation (2) shown below.

$$\varepsilon_A = \frac{V_1}{V_1+V_2+V_3}\varepsilon_1 + \frac{V_2}{V_1+V_2+V_3}\varepsilon_2 + \frac{V_3}{V_1+V_2+V_3}\varepsilon_3 \quad (2)$$

Where, "$\varepsilon_A$" indicates the entire area detection efficiency. "$\varepsilon_1$" indicates the post-correction similar area detection efficiency of the first similar area. "$\varepsilon_2$" indicates the post-correction similar area detection efficiency of the second similar area. "$\varepsilon_3$" indicates the post-correction similar area detection efficiency of the third similar area. "$V_1$" indicates the volume of the first similar area. "$V_2$" indicates the volume of the second similar area. "$V_3$" indicates the volume of the third similar area.

Meanwhile, "$V_1$" may be a variable which indicates mass of the first similar area. In this case, "$V_2$" is a variable which indicates mass of the second similar area, and "$V_3$" is a variable which indicates mass of the third similar area.

As described above, the calculation unit 367 is capable of calculating the entire area detection efficiency of the measurement target gamma-rays indicated by the information selected in step S150 using Equation (2). That is, the calculation unit 367 is capable of calculating the detection efficiency, which is detected by the gamma-ray detection unit 10, of the measurement target gamma-rays and which is acquired after the TCS correction is performed, for the two or more measurement target gamma-rays having the possibility that the TCS effect is generated among the gamma-rays emitted from the measurement target nuclide selected in step S130, as the entire area detection efficiency by performing the repetition processes of steps S150 to S200.

After the process of step S200 is performed, the calculation unit 367 transitions to step S150, and selects information which indicates subsequent measurement target gamma-rays.

Meanwhile, in a case where the information that indicates a measurement target gamma-ray, which is not selected in step S150, does not exist, the calculation unit 367 transitions to step S210.

In step S210, the calculation unit 367 reads the spectrum information, which is previously stored in the storage unit 32, from the storage unit 32. The spectrum information is spectrum information according to the first container MB1. Furthermore, the calculation unit 367 performs a predetermined process based on the plurality of entire area detection efficiencies, which are calculated in the repeatedly performed process of step S200, that is, the entire area detection efficiencies, which are detected by the gamma-ray detection unit 10, of the respective two or more measurement target gamma-rays having the possibility that the TCS effect is generated among the measurement target gamma-rays emitted from the measurement target nuclide indicated by the information received from the user in step S130, and the read spectrum information (step S210).

The process may be a process of calculating a count of each of the two or more measurement target gamma-rays, may be a process of calculating the radioactivity of the measurement target nuclide, or may be another process.

As described above, the control apparatus 30 calculates, for each of the similar areas corresponding to the plurality of similar shape areas acquired through division on the area in the first container (in the example, the first container MB1), into which the sample (in the example, the sample RA) is stuffed and which has a shape surrounding at least a part of the gamma-ray detection unit (in the example, the gamma-ray detection unit 10) which detects the gamma-rays, the detection efficiency, which is detected by the gamma-ray detection unit, of the gamma-rays emitted from the sample included in the similar area as the similar area detection efficiency based on a result of detection performed by the gamma-ray detection unit.

Therefore, the control apparatus 30 is capable of accurately calculating the detection efficiency, which is detected by the gamma-ray detection unit, of the gamma-rays emitted from the sample stuffed into the first container, based on the calculated similar area detection efficiency without performing Monte-Carlo simulation.

In addition, the control apparatus 30 calculates, for each of the similar areas corresponding to the plurality of similar shape areas acquired through division performed on the area inside the first container, which is the Marinelli container, into which the sample is stuffed, and which has a shape surrounding at least a part of the gamma-ray detection unit that detects the gamma-rays, the detection efficiency, which is detected by the gamma-ray detection unit, of the gamma-rays emitted from the sample included in the similar area, as the similar area detection efficiency based on the result of detection performed by the gamma-ray detection unit.

Therefore, the control apparatus 30 is capable of accurately calculating the detection efficiency, which is detected by the gamma-ray detection unit, of the gamma-rays emitted from the sample stuffed into the first container that is the Marinelli container, based on the calculated similar area detection efficiency without performing the Monte-Carlo simulation.

In addition, the control apparatus 30 calculates the detection efficiency, which is detected by the gamma-ray detection unit, of the gamma-rays emitted from the sample included in each of the similar areas corresponding to the plurality of similar shape areas acquired through division performed on the area inside the first container, into which the sample is stuffed and which has a shape surrounding at least the detection element of the gamma-ray detection unit, and calculates the radioactivity based on the calculated detection efficiency.

Therefore, the control apparatus 30 is capable of accurately calculating the detection efficiency, which is detected by the gamma-ray detection unit, of the gamma-rays emitted from the sample stuffed into the first container, which is a container having a shape surrounding at least the detection element of the gamma-ray detection unit, based on the calculated similar area detection efficiency without performing the Monte-Carlo simulation.

In addition, the control apparatus 30 calculates, for each of the second containers (in the example, the 21-st container, the 22-nd container, and the 23-rd container) which are containers into which the sample is stuffed and which correspond to a plurality of containers each having the similar shape to the first container, the similar area detection efficiency based on the first reference information in which is including at least an information in which a plurality of second container information and a plurality of first-reference-detection efficiency information respectively associated with each of the second container information are associated with each other. Each of the second container information indicates the second containers, respectively. And, the first reference detection efficiency information indicates a detection efficiency detected by the gamma-ray detection unit, for each of gamma-rays having energies different from each other among the gamma-rays emitted from the sample inside each of the second containers.

Therefore, the control apparatus 30 is capable of accurately calculating the detection efficiency, which is detected by the gamma-ray detection unit, of the gamma-rays emitted from the sample stuffed into the first container based on the similar area detection efficiency calculated based on the first reference information without performing the Monte-Carlo simulation.

In addition, the control apparatus 30 divides the area inside the first container into the plurality of similar areas based on area inside each of the second containers.

Therefore, control apparatus 30 is capable of accurately calculating the detection efficiency (in the example, the entire area detection efficiency), which is detected by the gamma-ray detection unit, of the gamma-rays emitted from the sample stuffed into the first container based on the plurality of similar areas acquired through division performed on the area inside the first container based on the areas inside the containers of the plurality of respective second containers without performing the Monte-Carlo simulation.

<Second Detailed Example of Process of Calculating Detection Efficiency of Two or More Measurement Target Gamma-Rays Having Possibility that TCS Effect is Generated>

Hereinafter, a second detailed example of a process of the control apparatus 30 calculating the detection efficiency, which is detected by the gamma-ray detection unit 10, of the two or more measurement target gamma-rays having the possibility that the TCS effect is generated will be described with reference to FIG. 8. In the second detailed example, in a case where the detection efficiency, which is the detection efficiency of the measurement target gamma-rays emitted from the sample RA in the first container MB1 and is acquired after the TCS correction is performed, is calculated, the control apparatus 30 calculates the similar area detection efficiency for each of the plurality of similar areas, acquired through division performed on the area inside the first container MB1, based on second reference information.

The second reference information is an information in which a plurality of volume relating to an container, which has a similar shape to the first container MB1, and a plurality of detection efficiencies respectively associated with each of the volume are associated with each other. Where, each of the detection efficiencies is detected by the gamma-ray detection unit 10, for each of gamma-rays having energies different from each other among the gamma-rays emitted from the sample RA inside the container having the volume corresponding to the detection efficiency.

In other words, the second reference information is information which indicates a change, according to the change in the volume of the container, in the detection efficiency, which is detected by the gamma-ray detection unit 10, for each of the gamma-rays having different energies from each other among the gamma-rays emitted from the sample RA in the container.

Therefore, the control apparatus 30 is capable of minutely dividing the first container area, compared to a case of the process of the flowchart illustrated in FIG. 5. As a result, according to the control apparatus 30, it is possible to further accurately calculate the entire area detection efficiency of each of the measurement target gamma-rays. The second reference information will be described in detail later.

Figure 8:
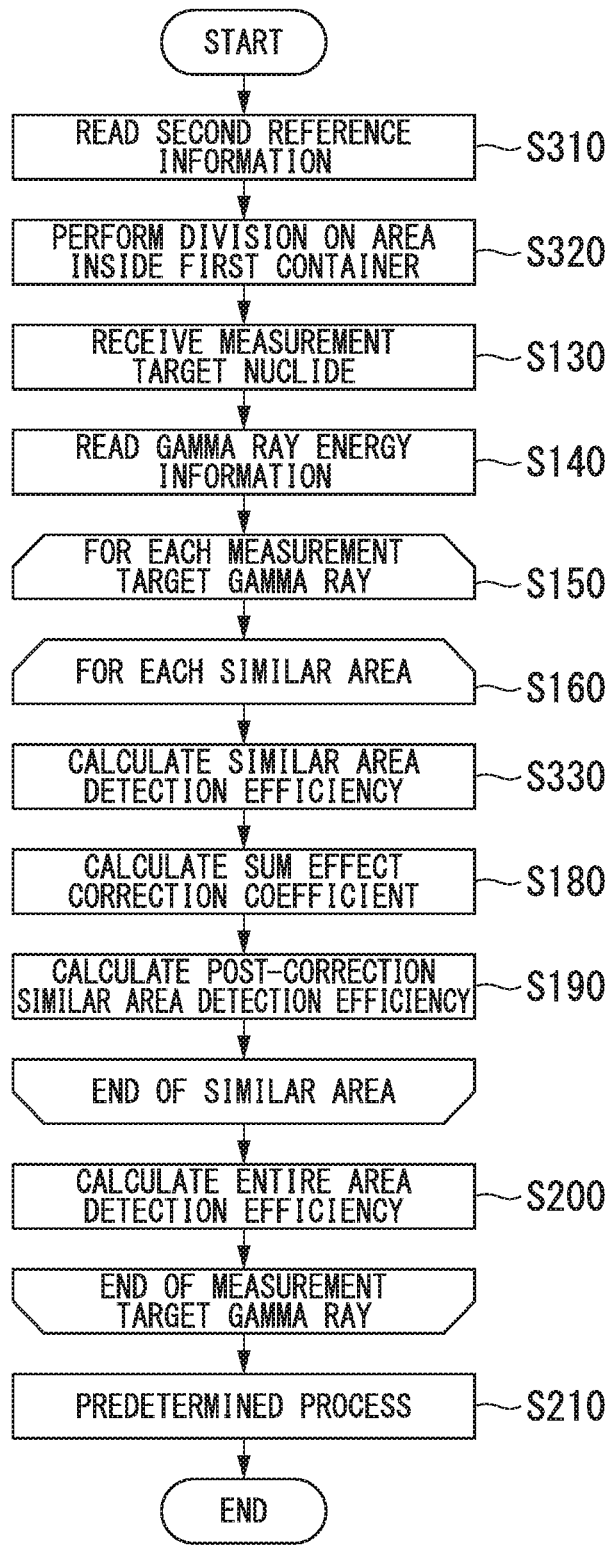
FIG. 8 is a flowchart illustrating another example of the flow of the process of the control apparatus 30 calculating the detection efficiency, which is detected by the gamma-ray detection unit 10, of the two or more gamma-rays which cause the TCS effect to be generated.

FIG. 8 is a flowchart illustrating another example of the flow of the process of the control apparatus 30 calculating the detection efficiency, which is detected by the gamma-ray detection unit 10, of the two or more gamma-rays which cause the TCS effect to be generated.

Meanwhile, since respective processes of steps S130 to S150 in the flowchart illustrated in FIG. 8 and processes of steps S180 to S210 in the flowchart are the same as in the processes of steps S130 to S150 in the flowchart illustrated in FIG. 5 and the processes of steps S180 to S210 in the flowchart, the description thereof will not be repeated. In the flowchart, a case will be described where the control apparatus 30 previously receives the operation of starting the process from the user at timing before the process of step S310 starts. In the flowchart, a case will be described where the spectrum information according to the first container MB1 is previously stored in the storage unit 32 at the timing. That is, in the flowchart, a case will be described where the measurement system 1 previously finishes detection, which is performed by the gamma-ray detection unit 10, of the gamma-rays and generation, which is performed by the pulse height analysis apparatus 20, of the spectrum based on the signal which indicates the gamma-rays detected by the gamma-ray detection unit 10 for the gamma-rays emitted from the sample RA included in the first container MB1 at the timing.

The calculation unit 367 reads the second reference information, which is previously stored in the storage unit 32, from the storage unit 32 (step S310).

Where, the second reference information will be described. As described above, the second reference information is information which indicates a change, according to the change in the volume of the container, which referred to a third container in the below, in the detection efficiency, which is detected by the gamma-ray detection unit 10, for each of the gamma-rays having different energies from each other among the gamma-rays emitted from the sample RA in the container. Hereinafter, as an example, a case will be described where the second reference information is a function which indicates a change in each of the detection efficiencies with respect to the change in the volume of the third container. That is, hereinafter, as an example, a case will be described where the second reference information is a function which indicates a change, according to the change in the volume of the third container, in the detection efficiency, which is detected by the gamma-ray detection unit 10, for each of the gamma-rays having energies different from each other among the gamma-rays emitted from the sample RA in the third container. In addition, hereinafter, as an example, a case will be described where the third container is the above-described second container.

Meanwhile, the second reference information may be a table in which the change in the volume is associated with the change in each of the detection efficiencies. The third container may be a container which is different from the second container. That is, the second reference information may be a table, which indicates a change, according to the change in the volume of the third container, in the detection efficiency, which is detected by the gamma-ray detection unit 10, for each of the gamma-rays having energies different from each other among the gamma-rays emitted from the sample RA in the third container. That is, the second reference information may be information in which a plurality of volume relating to the third container and a plurality of detection efficiencies respectively associated with each of the volume are associated with each other.

Figure 9:
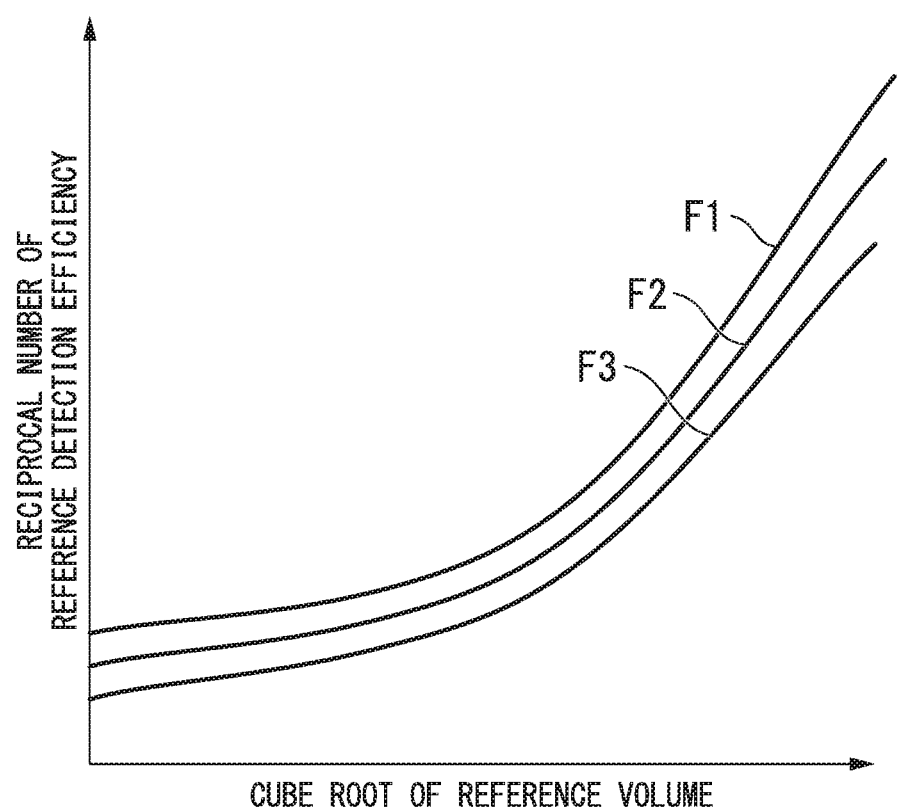
FIG. 9 is a graph illustrating an example of second reference information.

FIG. 9 is a graph illustrating an example of the second reference information.

A horizontal axis of the graph illustrated in FIG. 9 indicates a cube root of the volume of the second container. A vertical axis of the graph indicates the detection efficiency, which is detected by the gamma-ray detection unit 10, of the gamma-rays. Meanwhile, in order to avoid the drawing being complicated, the graph illustrates only three functions, that is, functions F1 to F3 among functions which each indicate the change in the detection efficiency of each of the gamma-rays, which are emitted from the sample RA in the second container and have energies different from each other, with respect to a change in the volume of the second container. The function F1 illustrates a change in the detection efficiency with respect to the change in the volume, that is, the change in the detection efficiency, which is detected by the gamma-ray detection unit 10, of the gamma-rays having an energy of 800 keV. That is, the function F1 represents the change according to the change in the volume of the detection efficiency, which is detected by the gamma-ray detection unit 10, of the gamma-rays. The function F2 represents the change in the detection efficiency with respect to the change in the volume, that is, the change in the detection efficiency, which is detected by the gamma-ray detection unit 10, of the gamma-rays having an energy of 400 keV. That is, the function F2 indicates the change in the detection efficiency, which is detected by the gamma-ray detection unit 10, of the gamma-rays according to the change in the volume. The function F3 represents the change in the detection efficiency with respect to the change in the volume, that is, the change in the detection efficiency, which is detected by the gamma-ray detection unit 10, of the gamma-rays having an energy of 200 keV. That is, the function F3 represents a change in the detection efficiency, which is detected by the gamma-ray detection unit 10, of the gamma-rays according to the change in the volume.

The function as illustrated in FIG. 9, that is, the second reference information is generated based on, for example, the above-described first reference information. Therefore, the control apparatus 30 may be configured such that the second reference information, which is generated by another apparatus, is previously stored in the storage unit 32 by the user. In addition, the control apparatus 30 may be configured to generate the second reference information based on the first reference information. A process of the control apparatus 30 generating the second reference information will be described later.

Meanwhile, the second reference information may be information which indicates the change in the detection efficiency of each of the gamma-rays, which are emitted from the sample RA in the container and have energies different from each other, with respect to a change in mass (for example, the volume of the third container×density of the sample RA) of the third container that is the container, into which the sample RA is stuffed and which has a shape similar to the first container MB1. That is, an information in which a plurality of mass relating to the third container and a plurality of detection efficiencies respectively associated with each of the mass are associated with each other. Where, each of the detection efficiencies is detected by the gamma-ray detection unit 10, for each of gamma-rays having energies different from each other among the gamma-rays emitted from the sample RA inside the container having the mass corresponding to the detection efficiency. In the other words, the second reference information may be information which indicates the change, according to the change in the mass of the third container, in the detection efficiency, which is detected by the gamma-ray detection unit 10, for each of the gamma-rays having energies different from each other among the gamma-rays emitted from the sample RA in the third container.

After the process of step S310 is performed, the calculation unit 367 reads the information, which is previously stored in the storage unit 32, that is, the second container shape information, which indicates the shape of the first container MB1 and a shapes of the second containers (the third container in the example) having the plurality of respective volumes, from the storage unit 32. The calculation unit 367 divides the first container area into the plurality of similar areas using the read second container shape information through a process which is different from the process of step S120 of the flowchart illustrated in FIG. 5 (step S320). Where, the process of step S320 will be described with reference to FIG. 10.

Figure 10:
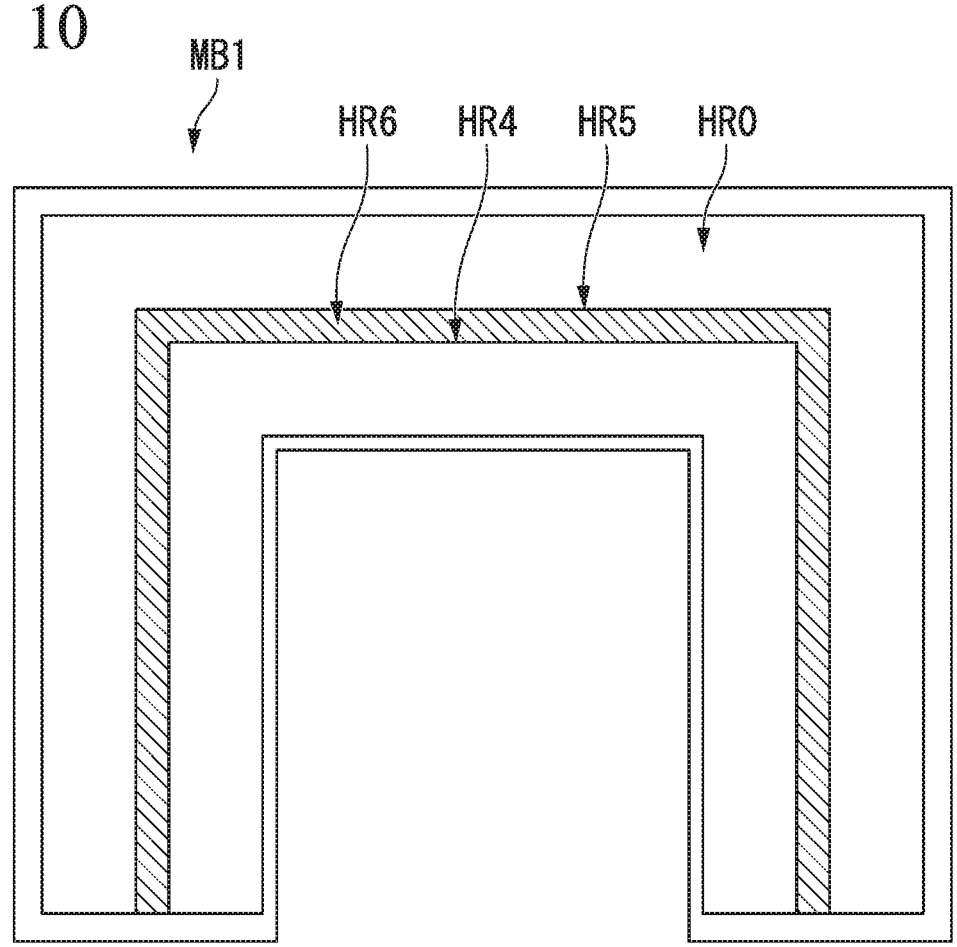
FIG. 10 is a diagram illustrating a process of step S320.

FIG. 10 is a diagram illustrating the process of step S320. In addition, a sectional diagram illustrated in FIG. 10 is a sectional diagram of the first container area illustrated in FIG. 7. An area HR4 indicates a similar shape area to the area HR0 which indicates the first container area. A volume of the area HR4 is smaller than the volume of the first container area. In addition, an area HR5 indicates a similar shape area to the area HR0. The volume of the area HR5 is equal to or smaller than the volume of the first container area and is larger than the volume of the area HR4. The calculation unit 367 has a volume according to each of the volumes of the area HR4 and the area HR5 based on the area HR4 and the area HR5 illustrated in FIG. 10, and is capable of extracting an area HR6 (in FIG. 10, a hashed area) which has a similar shape to the first container area. With a method for extracting the area HR6 from the first container area, the calculation unit 367 is capable of dividing the first container area into a plurality of similar areas based on the second container shape information read from the storage unit 32 and the area inside each of the containers of the plurality of second containers, and is capable of determining a volume of each of the plurality of similar areas acquired by performing division on the first container area based on the second reference information.

Where, hereinafter, as an example, a case will be described where the calculation unit 367 divides the first container area into the plurality of similar areas have the same volumes with each other in step S320.

Meanwhile, the calculation unit 367 may be configured to divide the first container area into a plurality of similar areas in which a part or an entirety has volumes different from each other in step S320.

The calculation unit 367 calculates a volume of each of the plurality of similar areas as a unit volume by performing division on the volume of the first container area by a predetermined number which is previously received from the user. In the example, the predetermined number is a number which is capable of dividing the volume without remainder. Instead, the predetermined number may be a number which is not capable of dividing the volume without remainder. The calculation unit 367 receives, for example, the predetermined number from the user through the above-described operation screen.

The calculation unit 367 specifies an area, which has a volume of 0 liter, in the second container and overlaps an area in the detection unit fixing state, as a third reference area in the first container area. In addition, the calculation unit 367 specifies an area, which has the calculated unit volume, in the second container and overlaps the area in the detection unit fixing state, as a fourth reference area in the first container area. Furthermore, in the first container area, the calculation unit 367 specifies an area, which overlaps with the fourth container area and does not overlap with the third container area as a first-similar area (that is, a similar area to be selected first). The calculation unit 367 associates third reference volume information, which indicates the volume of the third reference area, with fourth reference volume information, which indicates the volume of the fourth reference area, with respect to the specified first-similar area.

Subsequently, the calculation unit 367 specifies an area inside the second container, which has a volume (that is, the unit volume) acquired by adding the unit volume to the volume of the third reference area in the detection unit fixing state in the first container, as a new third reference area. In addition, the calculation unit 367 specifies an area inside the second container, which has a volume (that is, two times of the unit volume) acquired by adding the unit volume to the volume of the fourth reference area in the detection unit fixing state, as a new fourth reference area in the first container area.

Furthermore, in the first container area, the calculation unit 367 specifies an area, which overlaps with the fourth container area and does not overlap with the third container area as a second-similar area (that is, a similar area to be selected next to the first-similar area). The calculation unit 367 associates the third reference volume information, which indicates the volume of the third reference area, and the fourth reference volume information, which indicates the volume of the fourth reference area, with respect to the specified second-similar area.

Subsequently, the calculation unit 367 specifies an area, which is in an area inside the second container having a volume (two times of the volume of the unit volume) acquired by adding the unit volume to the volume of the third reference area in the detection unit fixing state as a new third reference area in the first container area. In addition, the calculation unit 367 specifies an area, which is in an area inside the second container having a volume (three times of the volume of the unit volume) acquired by adding the unit volume to the volume of the fourth reference area in the detection unit fixing state as a new fourth reference area in the first container area.

Furthermore, in the first container area, the calculation unit 367 specifies an area, which overlaps with the fourth container area and does not overlap with the third container area as a third-similar area (that is, a similar area to be selected next to the second-similar area). The calculation unit 367 associates the third reference volume information, which indicates the volume of the third reference area, with the fourth reference volume information, which indicates the volume of the fourth reference area, with respect to the specified third-similar areas.

The calculation unit 367 specifies the similar area as described above until the number of specified similar areas reaches the above-described predetermined number.

That is, a similar area corresponding to a predetermined-number of pieces is an area, which overlaps with the fourth reference area having a volume of (predetermined-number—1) times the unit volume and does not overlap the third reference area having a volume of a predetermined number times the unit volume, in the first container area. In addition, the similar area is associated with the third reference volume information, which indicates the volume of the third reference area, and the fourth reference volume information, which indicates the volume of the fourth reference area.

As described above, the calculation unit 367 is capable of dividing the first container area into a plurality of (in the example, a predetermined number of) similar areas using the third reference area and the fourth reference area.

Where, in step S160 illustrated in FIG. 8, the calculation unit 367 repeatedly performs the processes of steps S170 to S190 for each of the predetermined number of similar areas acquired through division performed on the first container area in step S320. For example, the calculation unit 367 sequentially selects the predetermined number of similar areas toward the outside from the inside in the first container area one by one as the target similar area, and repeatedly performs the process for each of the selected target similar areas. Meanwhile, the calculation unit 367 may be configured to randomly select the target similar area one by one among the predetermined number of similar areas, may be configured to sequentially select the predetermined number of similar areas one by one as the target similar area from a large volume side to a small volume side in the area, and may be configured to sequentially select the predetermined number of similar areas one by one as the target similar area using another method.

After the target similar area is selected in step S160 illustrated in FIG. 8, the calculation unit 367 calculates the similar area detection efficiency for the target similar area, which is selected in step S160, based on the second reference information which is read from the storage unit 32 in step S310 (step S330).

Where, the process of step S330 will be described.

The calculation unit 367 calculates the detection efficiency according to the volume, which is indicated by the third reference volume information associated with the target similar area selected in step S160, and the detection efficiency of the measurement target gamma-rays, which is indicated by the information selected in step S150, as the 21-st reference detection efficiency based on the second reference information which is read in step S310.

Meanwhile, in a case where the volume, which is indicated by the third reference volume information, is 0 liter, the calculation unit 367 calculates (specifies) 0 as the 21-st reference detection efficiency.

In addition, the calculation unit 367 calculates the detection efficiency according to the volume, which is indicated by the fourth reference volume information associated with the target similar area selected in step S160, and the detection efficiency of measurement target gamma-rays, which is indicated by the information selected in step S150, as the 22-nd reference detection efficiency based on the second reference information which is read in step S310.

Furthermore, the calculation unit 367 calculates the similar area detection efficiency for the measurement target gamma-rays indicated by the information selected in step S150 and for the target similar area based on Equation (1). In this case, "Vs" in Equation (1) is the volume which is indicated by the third reference volume information associated with the target similar area, and "$V_L$" in Equation (1) is the volume which is indicated by the fourth reference volume information associated with the target similar area. "$\varepsilon_S(E)$" in Equation (1) indicates the specified 21-st reference detection efficiency. "$\varepsilon_L(E)$" in Equation (1) indicates the specified 12-th reference detection efficiency.

As described above, the calculation unit 367 is capable of calculating the similar area detection efficiency for the measurement target gamma-rays indicated by the information selected in step S150 and the similar area detection efficiency for the target similar area using the second reference information which is read from the storage unit 32 in step S310 using Equation (1).

Where, the process performed by the control apparatus 30 in a case where the control apparatus 30 generates the second reference information will be described.

Figure 11:
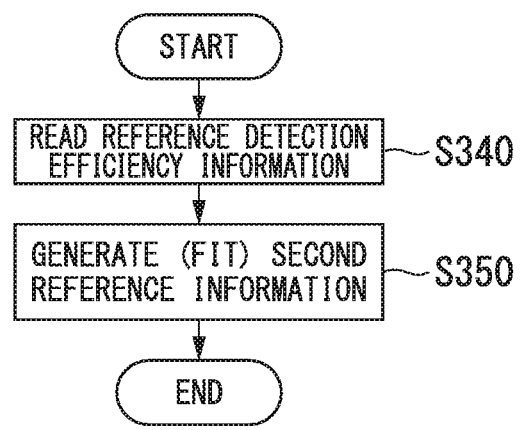
FIG. 11 is a flowchart illustrating an example of a flow of a process performed by the control apparatus 30 in a case where the control apparatus 30 generates the second reference information.

FIG. 11 is a flowchart illustrating an example of a flow of the process performed by the control apparatus 30 in a case where the control apparatus 30 generates the second reference information. Meanwhile, in the flowchart illustrated in FIG. 11, a case will be described where the control apparatus 30 previously receives the operation of starting the process from the user at timing before the process of step S340 starts.

The calculation unit 367 reads reference detection efficiency information, which is previously stored in the storage unit 32, from the storage unit 32 (step S340). The reference detection efficiency information is including at least an information in which a plurality reference volume information, which is indicates each of two or more volumes which are different from each other, respectively associated with the detection efficiency of each of the gamma-rays, which are emitted from the sample RA, stuffed into the container having the volume and a shape similar to the first container MB1, and which have energies different from each other.

Hereinafter, as an example, a case will be described where the three or more volumes include only three volumes, that is, V11 liters, V12 liters, and V13 liters. Meanwhile, the three or more volumes may be configured to include another volume instead of a part or an entirety of the three volumes, and may be configured to include another volume in addition to a part or an entirety of the three volumes. In addition, the control apparatus 30 may be configured to store reference detection efficiency information, which is generated by another apparatus, in the storage unit 32, and may be configured to generate the reference detection efficiency information and to store the generated reference detection efficiency information in the storage unit 32. In a case where the control apparatus 30 generates the reference detection efficiency information, the control apparatus 30 may be configured to calculate the detection efficiency of each of the gamma-rays, which are emitted from the sample RA stuffed into each of the containers having the three or more volumes different from each other, and the gamma-rays, which have energies different from each other, by, for example, the process in the flowchart illustrated in FIG. 5, and may be configured to generate the reference detection efficiency information based on the calculated detection efficiency and the three or more volumes.

Subsequently, the calculation unit 367 generates the second reference information based on the reference detection efficiency information which is read from the storage unit 32 in step S340 (step S350).

Where, the process of step S350 will be described with reference to FIGS. 12 and 13.

Figure 12:
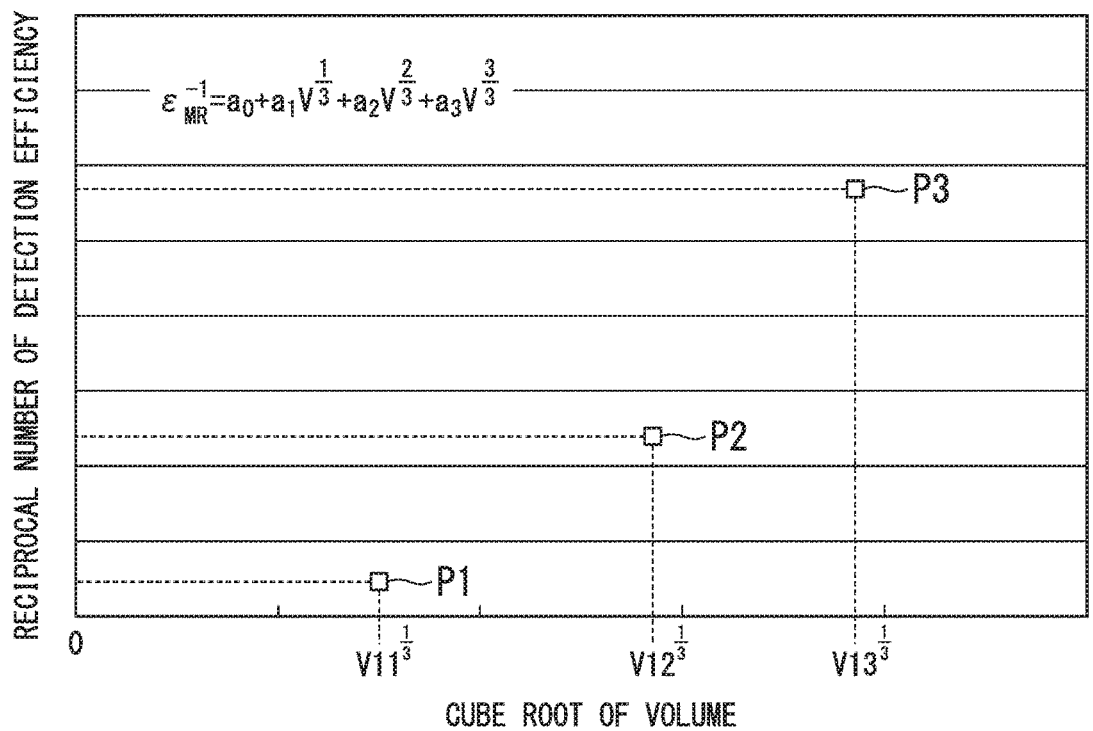
FIG. 12 is a graph plotting a relationship between a volume of a container which has a shape similar to the first container MB1 and the detection efficiency of the gamma-rays emitted from a sample RA of each of the three containers.

FIG. 12 is a graph plotting, for each of the three containers, a relationship between a volume of the container, which has a shape similar to the first container MB1, and the detection efficiency of a gamma-rays emitted from the sample RA of the container.

The three containers are the respective containers having three volumes indicated by the reference volume information included in the reference detection efficiency information, which is read from the storage unit 32 by the calculation unit 367 in step S340. The gamma-rays are used as an example have an energy of 700 keV.

A horizontal axis of the graph illustrated in FIG. 12 indicates a cube root of the volume of the container which has a shape similar to the first container MB1. A vertical axis of the graph indicates a reciprocal number of the detection efficiency of the gamma-rays, which are emitted from the sample RA of the container, have energy of 700 keV.

A point P1 of the graph of FIG. 12 indicates the detection efficiency of the gamma-rays emitted from the sample RA of the container which has the shape similar to the first container MB1 of V11 liters. A point P2 of the graph of FIG. 12 indicates the detection efficiency of the gamma-rays emitted from the sample RA of the container which has a shape similar to the first container MB1 of V12 liters. A point P3 of the graph of FIG. 12 indicates the detection efficiency of the gamma-rays emitted from the sample RA of the container which has a shape similar to the first container MB1 of V13 liters.

The calculation unit 367 is capable of generating the second reference information for gamma-rays of 700 keV by fitting about the points P1, P2, P3 of the graph illustrated in FIG. 12 using a predetermined fitting function. The fitting function is, for example, a third-degree polynomial function as illustrated in FIG. 12. "$\varepsilon_{MR}$" in the fitting function indicates the detection efficiency of the gamma-rays. Each of "$a_0, a_1, a_2,$ and $a_3$" in the fitting function indicates a fitting parameter. "V" in the fitting function indicates the volume of the container which has a shape similar to the first container MB1.

Meanwhile, the fitting function may be another function of a third-degree or higher polynomial function, an exponential function, or the like. However, seen from our experience, the fitting function used in the process of step S350 has high fitting accuracy, compared to a case of a function other than the third-degree polynomial function, and thus the third-degree polynomial function is desirable.

Figure 13:
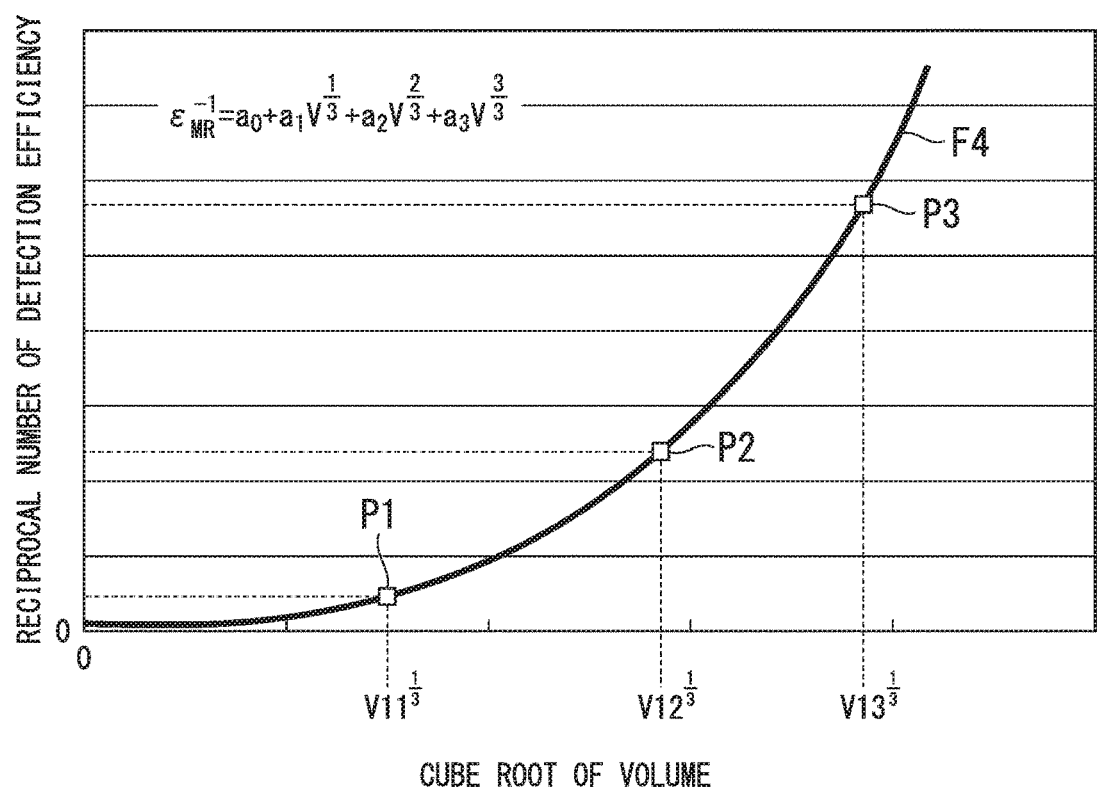
FIG. 13 is a graph illustrating an example of a result acquired by fitting the plots illustrated in FIG. 12 using a fitting function.

FIG. 13 is a graph illustrating an example of a result acquired by fitting the plots illustrated in FIG. 12 using the fitting function. A function "F4" illustrated in FIG. 13 is a result acquired by fitting the plots illustrated in FIG. 12 using the fitting function, and indicates the second reference information for the gamma-rays of 700 keV. With the process, the calculation unit 367 is capable of generating the second reference information based on the reference detection efficiency information which is read from the storage unit 32 in step S340.

Therefore, the control apparatus 30 is capable of accurately calculating the detection efficiency, which is detected by the gamma-ray detection unit 10, of the gamma-rays emitted from the sample RA stuffed into the first container MB1 based on the generated second reference information without performing the Monte-Carlo simulation.

As described above, the control apparatus 30 calculates the similar area detection efficiency based on the second reference information which indicates the change in the detection efficiency, which is detected by the gamma-ray detection unit (in the example, the gamma-ray detection unit 10), of each of the gamma-rays which are emitted from the sample (in the example, sample RA) in the third container and which have energies different from each other with respect to the change in the volume of the third container (in the example, the second container) that is a container which has a similar shape to the first container (in the example, the first container MB1) and into which the sample is stuffed.

Therefore, the control apparatus 30 is capable of accurately calculating the detection efficiency, which is detected by the gamma-ray detection unit, of the gamma-rays emitted from the sample stuffed into the first container based on the similar area detection efficiency, which is calculated based on the second reference information, without performing the Monte-Carlo simulation.

In addition, the control apparatus 30 divides the area inside the first container into a plurality of similar areas based on the area in each of two third containers having volumes indicated by the second reference information and having volumes different from each other.

Therefore, the control apparatus 30 is capable of accurately calculating the detection efficiency, which is detected by the gamma-ray detection unit, of the gamma-rays emitted from the sample stuffed into the first container based on the plurality of similar areas, acquired through division performed on the area inside the first container, based on the area inside the respective two third containers having the volumes indicated by the second reference information and having volumes different from each other without performing the Monte-Carlo simulation.

In addition, the control apparatus 30 generates the second reference information based on information in which the reference detection efficiency (in the example, the detection efficiency indicated by the reference detection efficiency information), which is a plurality of reference of the detection efficiency, is associated with the volume (in the example, the volume indicated by the reference volume information), which is associated with each of the reference detection efficiencies.

Therefore, the control apparatus 30 is capable of accurately calculating the detection efficiency, which is detected by the gamma-ray detection unit, of the gamma-rays emitted from the sample stuffed into the first container based on the generated second reference information without performing the Monte-Carlo simulation.

In addition, the control apparatus 30 calculates the similar area detection efficiency based on the second reference information which indicates the change in the detection efficiency, which is detected by the gamma-ray detection unit, of each of the gamma-rays, which are emitted from the sample in the third container and which have energies different from each other, with respect to the change in the mass of the third container that is a container which has a similar shape to the first container and into which the sample is stuffed.

Therefore, the control apparatus 30 is capable of accurately calculating the detection efficiency, which is detected by the gamma-ray detection unit, of the gamma-rays emitted from the sample stuffed into the first container based on the similar area detection efficiency calculated based on the second reference information without performing the Monte-Carlo simulation.

<Third Detailed Example of Process of Calculating Detection Efficiency of Two or More Measurement Target Gamma-Rays Having Possibility that TCS Effect is Generated>

Hereinafter, a third detailed example of a process of the control apparatus 30 calculating the detection efficiency, which is detected by the gamma-ray detection unit 10, of the two or more measurement target gamma-rays having the possibility that the TCS effect is generated will be described with reference to FIG. 14. In the third detailed example, in a case where the control apparatus 30 calculates the detection efficiency, which is a detection efficiency of the measurement target gamma-rays emitted from the sample RA in the first container MB1, acquired after the TCS correction is performed, the control apparatus 30 divides the similar area into a plurality of partial areas for each of the plurality of similar areas acquired through division performed on the area inside the first container MB1, and calculates the similar area detection efficiency of each of the similar areas based on the partial areas acquired through division.

Therefore, the control apparatus 30 is capable of further minutely dividing the first container area, compared to the cases of the processes of the flowcharts illustrated in FIGS. 5 and 8. As a result, the control apparatus 30 is capable of further accurately calculating the above-described post-correction similar area detection efficiency.

Figure 14:
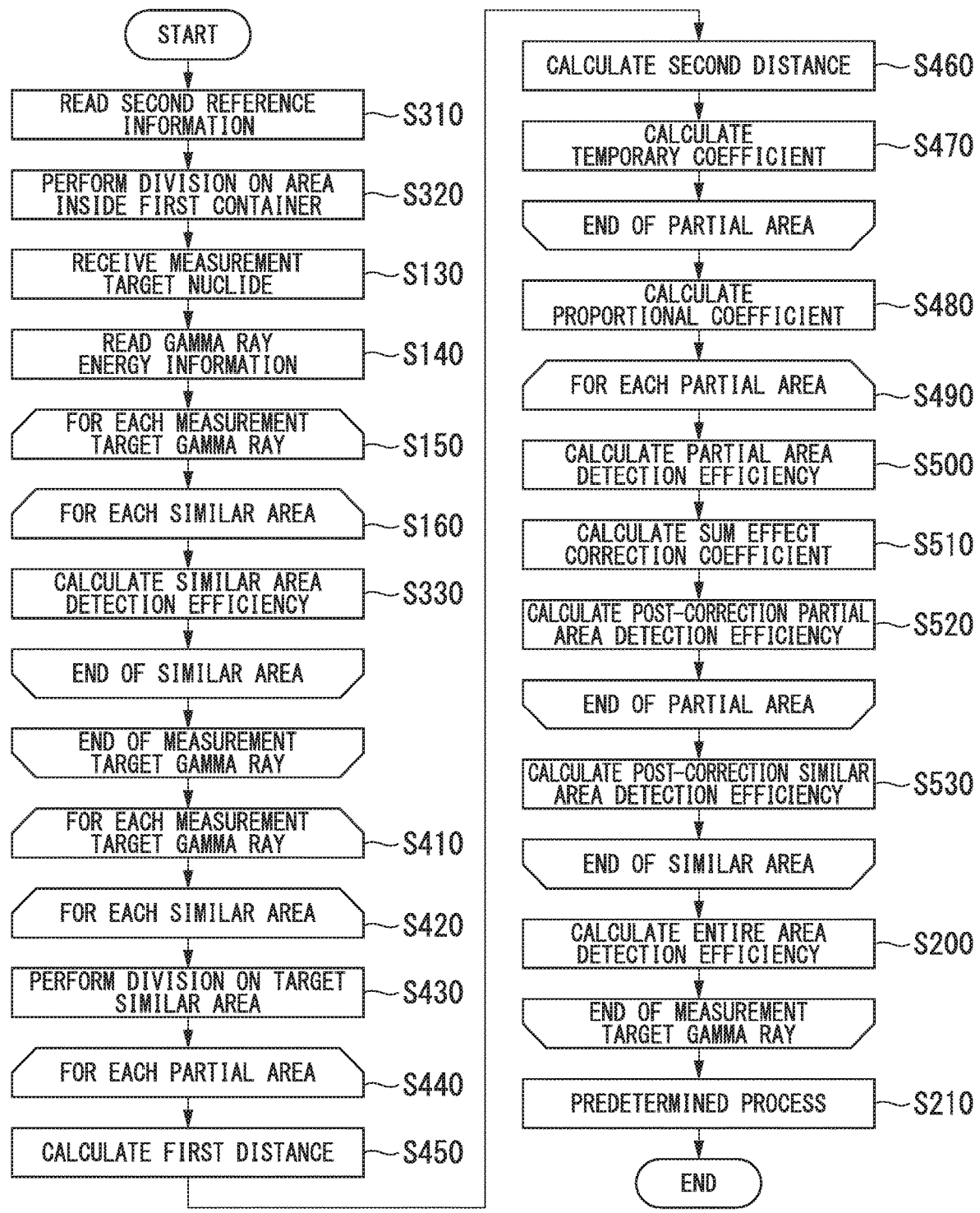
FIG. 14 is a flowchart illustrating further another example of the flow of the process of the control apparatus 30 calculating the detection efficiency, which is detected by the gamma-ray detection unit 10, of the two or more gamma-rays that cause the TCS effect to be generated.

FIG. 14 is a flowchart illustrating further another example of the flow of the process of the control apparatus 30 calculating the detection efficiency, which is detected by the gamma-ray detection unit 10, of the two or more gamma-rays that cause the TCS effect to be generated.

Meanwhile, since processes of steps S310 to S330 in the flowchart illustrated in FIG. 14 and processes of steps S200 to S210 in the flowchart are respectively the same as the processes of steps S310 to S330 in the flowchart illustrated in FIG. 8 and the processes of steps S200 to S210 in the flowchart, the description thereof will not be repeated. In the flowchart, a case will be described where the control apparatus 30 previously receives the operation of starting the process from the user at timing before the process of step S310 starts. In the flowchart, a case will be described where the spectrum information according to the first container MB1 is previously stored in the storage unit 32 at the timing. That is, in the flowchart, a case will be described where, for the gamma-rays emitted from the sample RA included in the first container MB1, the measurement system 1 already finishes detection, which is performed by the gamma-ray detection unit 10, of the gamma-rays and generation, which is performed by the pulse height analysis apparatus 20, of the spectrum based on the signal which indicates the gamma-rays detected by the gamma-ray detection unit 10 at the timing.

The calculation unit 367 selects information, which indicates the two or more measurement target gamma-rays extracted in step S140 illustrated in FIG. 14, one by one, and repeatedly performs the processes of steps S420 to S200 for each information which indicates the selected measurement target gamma-rays (step S410).

That is, the calculation unit 367 repeatedly performs the processes for each of the two or more measurement target gamma-rays having the possibility that the TCS effect is generated among the measurement target gamma-rays emitted from the measurement target nuclide indicated by the measurement target nuclide information received from the user in step S130 illustrated in FIG. 14.

After the information, which indicates the measurement target gamma-rays, is selected in step S410, the calculation unit 367 repeatedly performs processes of steps S430 to S530 for each of the predetermined number of similar areas acquired by performing division on the first container area in step S320 illustrated in FIG. 14 (step S420). For example, the calculation unit 367 sequentially selects the predetermined number of similar areas toward the outside from the inside in the first container area one by one as the target similar area, and repeatedly performs the process for each of the selected target similar areas. Meanwhile, the calculation unit 367 may be configured to randomly select the target similar area one by one among the predetermined number of similar areas, may be configured to sequentially select the predetermined number of similar areas one by one as the target similar area from a large volume side to a small volume side in the area, and may be configured to sequentially select the predetermined number of similar areas one by one as the target similar area using another method.

The calculation unit 367 reads the above-described second container shape information from the storage unit 32. The calculation unit 367 divides the target similar area selected in step S420 into the plurality of partial areas based on the read second container shape information (step S430). Where, the process of step S430 will be described. In a case where the calculation unit 367 divides the target similar area into the plurality of partial areas, the calculation unit 367 may perform division into any shape of division areas.

Hereinafter, as an example, a case will be described where division is performed on the target similar area such that the volumes of the target similar areas are substantially equal to each other such as that one partial area exists in a direction toward the outside of the gamma-ray detection unit 10 from the effective center of the gamma-ray detection unit 10.

Figure 15:
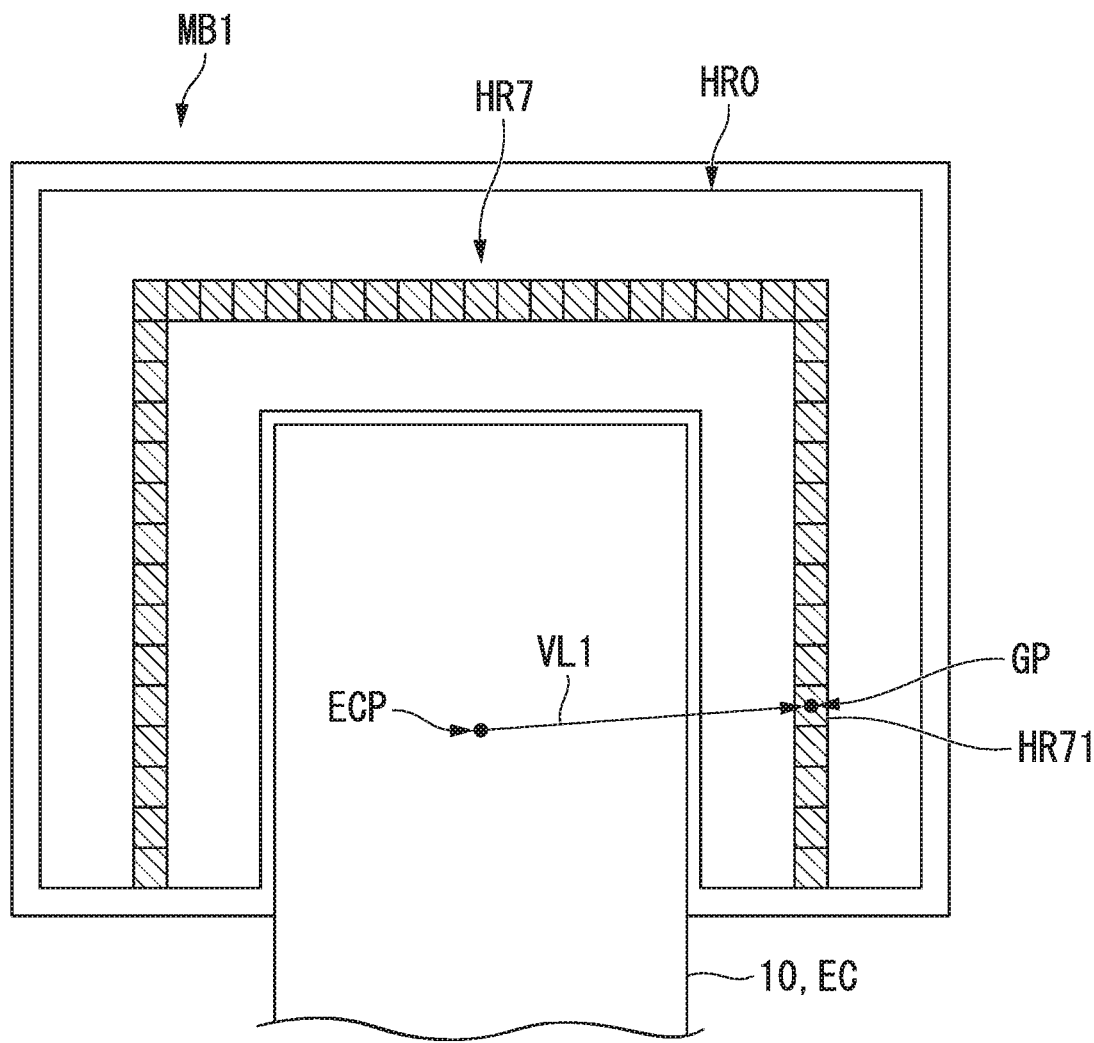
FIG. 15 is a diagram illustrating an example of a target similar area which is divided into a plurality of partial areas.

FIG. 15 is a diagram illustrating an example of the target similar area which is divided into the plurality of partial areas. A sectional diagram illustrated in FIG. 15 is the sectional diagram of the first container area illustrated in FIG. 10. FIG. 15 illustrates the end cap EC of the gamma-ray detection unit 10 in order to make clearly a relative locational relationship between the effective center of the gamma-ray detection unit 10 and the partial area.

In step S430, the calculation unit 367 divides each of the plurality of similar areas, acquired through division performed on the first container area in the flowchart illustrated in FIG. 8, into the plurality of partial areas. An area HR7 illustrated in FIG. 15 indicates one similar area among the plurality of similar areas, acquired through division performed on the first container area in step S320 in the flowchart illustrated in FIG. 14. A plurality of hashed areas on an inner side of the area HR7 illustrated in FIG. 15 indicate a plurality of partial areas acquired through division performed on the one similar area.

Returning to FIG. 14.

After the process of step S430 is performed, the calculation unit 367 selects the plurality of partial areas, acquired through division performed on the target similar area in step S430, one by one as the target partial areas, and repeatedly performs the processes of steps S450 to S470 for each of the selected target partial areas (step S440).

After the target partial area is selected in step S440, the calculation unit 367 calculates a first distance which is a distance from a location of the effective center of the gamma-ray detection unit 10 to a location of the target partial area (step S450).

Where, the process of step S450 will be described with reference to FIG. 15 again.

An area HR71 illustrated in FIG. 15 is an example of the target partial area. A point GP illustrated in FIG. 15 indicates a location of the area HR71. In the example, the location of the target partial area is represented by a location of center of mass of the target partial area.

Meanwhile, instead of this, the location of the target partial area may be represented by another location according to the target partial area, such as a location of center of figure of the target partial area, an average center on the efficiency in the target partial area, or a location determined by random sampling numbers in the target partial area.

A point ECP illustrated in FIG. 15 indicates the effective center of the gamma-ray detection unit 10 as described above. The calculation unit 367 generates a vector from the point ECP to the point GP. Furthermore, the calculation unit 367 calculates the norm of the vector as the first distance which is a distance from the location of the effective center of the gamma-ray detection unit 10 to the location of the target partial area.

After the process of step S450 is performed, the calculation unit 367 calculates a length of a segment which overlaps the sample RA that exists on a side of the point ECP rather than the location of the target partial area as a second distance among segments on the vector based on the vector calculated in step S450 (step S460). That is, the second distance is a distance, in which the gamma-rays emitted from the location of the target partial area pass through the sample RA, until the gamma-rays move up to the effective center.

Subsequently, the calculation unit 367 calculates a temporary coefficient based on the first distance calculated in step S450 and the second distance calculated in step S460 (step S470).

Where, the temporary coefficient and the process of step S470 will be described, respectively.

The detection efficiency of the gamma-rays emitted from the sample RA in the target partial area in a location separated from the location of the target partial area by the first distance is proportional to an exponential function (Specifically, an exponential function in which a Napier's constant "e" is used as a base), which has a value multiplied by a linear attenuation coefficient "$\mu$" that indicates attenuation in accordance with pathlength of the gamma-rays in the sample RA and "$-L_j$", is used as an index, and is inverse proportional to a square of the first distance. The proportional relation is represented by Equation (3) shown below.

$$\varepsilon_j = K \frac{1}{r_j^2} e^{-\mu L_j} \quad (3)$$

Where, "j" is an integer which indicates each of the partial areas, and is any one of positive integers 1 to M in a case where the number of partial areas is "M". "$\varepsilon_j$" indicates a detection efficiency of the partial area indicated by "j". The detection efficiency is the detection efficiency of the gamma-rays emitted from the sample RA in the partial area. "$r_j$" indicates the first distance in the partial area indicated by "j". "$L_j$" indicates the second distance in the partial area indicated by "j". "$\mu$" is the linear attenuation coefficient in a case where the gamma-rays move in the sample RA, as described above.

Meanwhile, "$\mu$" may be a value corresponding to the linear attenuation coefficient, which is determined by the product of a specific mass attenuation coefficient and a density that is a variable, instead of the linear attenuation coefficient. "K" is a proportional coefficient in a proportional relationship represented by Equation (3) and is a proportional coefficient according to the target similar area.

In a case where the linear attenuation coefficient "$\mu$" is previously calculated in Equation (3), it is possible to calculate "$\varepsilon_j$" in a case where "j" indicates the target partial area using Equation (3) if it is possible to know the proportional coefficient "K" according to the target similar area.

Where, in a case where the sum about "j" is acquired on each of the both sides of Equation (3), a left side becomes the similar area detection efficiency for the target similar area. That is, in this case, Equation (3) is modified as Equation (4) shown below.

$$\varepsilon_i = \sum_j K \frac{1}{r_j^2} e^{-\mu L_j} \quad (4)$$

Where, "i" is an integer which indicates each of the similar areas, and is any of positive integers 1 to V in a case where the number of similar areas is "V". In addition, "$\varepsilon_i$" indicates a similar area detection efficiency of the similar area indicated by "i".

"$\varepsilon_i$" is calculated in step S330 illustrated in FIG. 14. Therefore, in step S470, the calculation unit 367 calculates a value, which is calculated using the first distance calculated in step S450, the second distance calculated in step S460, the previously calculated linear attenuation coefficient "$\mu$", and Equation (5) shown below, as the above-described temporary coefficient. That is, the calculation unit 367 calculates the temporary coefficient for each of the plurality of partial areas, acquired through division performed on the target similar area, using the repetition processes of steps S440 to S470.

Furthermore, the calculation unit 367 is capable of calculating the proportional coefficient "K" using the similar area detection efficiency for the target similar area calculated in step S330 and Equation (4).

$$\frac{1}{r_j^2} e^{-\mu L_j} \quad (5)$$

Since the proportional coefficient "K" is calculated as described above, the calculation unit 367 calculates the temporary coefficient for the target partial area in step S470.

Meanwhile, the linear attenuation coefficient "$\mu$" may be configured to be calculated in step S470, and may be configured to be calculated at timing before the process of step S470 is performed.

After the repetition processes of steps S440 to S470 are performed, the calculation unit 367 calculates the proportional coefficient K based on the temporary coefficient of each of the plurality of partial areas, acquired through division performed on the target similar area, and the Equation (4) (step S480).

Subsequently, the calculation unit 367 selects the plurality of partial areas, acquired through division performed on the target similar area in step S430, one by one as the target partial areas again, and repeatedly performs the processes of steps S500 to S520 for each of the selected target partial areas (step S490). Since the process of step S490 is the same as the process of step S440, the description thereof will not be repeated.

After the target partial area is selected in step S490, the calculation unit 367 calculates the partial area detection efficiency for the selected target partial area (step S500).

The partial area detection efficiency for a certain partial area is the detection efficiency of the gamma-rays emitted from the sample RA in the certain partial area. In step S500, the calculation unit 367 calculates the partial area detection efficiency for the target partial area based on the proportional coefficient "K" calculated in step S480, the first distance for the target partial area calculated in step S450, the second distance for the target partial area calculated in step S460, the previously calculated linear attenuation coefficient "$\mu$", and Equation (3).

Subsequently, the calculation unit 367 calculates the TCS correction coefficient used to correct the partial area detection efficiency for the target partial area calculated in step S500 (step S510).

In step S510, since a method of the calculation unit 367 calculating the TCS correction coefficient is the same as the method of the calculation unit 367 calculating the TCS correction coefficient in step S180 illustrated in FIG. 5, the description thereof will not be repeated.

Subsequently, the calculation unit 367 calculates the post-correction partial area detection efficiency for the target partial area by multiplying the partial area detection efficiency for the target partial area calculated in step S500 by the TCS correction coefficient calculated in step S510 (step S520). Furthermore, the calculation unit 367 transitions to step S490, and selects a subsequent target partial area.

Meanwhile, in a case where a partial area, which is not selected as the target partial area, does not exist in step S490, the calculation unit 367 transitions to step S530.

After the repetition processes of steps S490 to S520 are performed, the calculation unit 367 calculates the post-correction similar area detection efficiency of the target similar area selected in step S420 based on each of the post-correction partial area detection efficiencies repeatedly calculated in step S520 of the repetition processes (step S530). Specifically, the calculation unit 367 calculates, for each of the plurality of partial areas acquired through division performed on the target similar area, a value which is acquired by multiplying a value, acquired by dividing a volume of the partial area by a volume of the target similar area, by the post-correction partial area detection efficiency for the partial area. The calculation unit 367 calculates the sum of the plurality of calculated values as the post-correction similar area detection efficiency. Furthermore, the calculation unit 367 transitions to step S420 and selects a subsequent target similar area. Meanwhile, in a case where the similar area, which is not selected as the target similar area, does not exist in step S420, the calculation unit 367 transitions to step S200, and calculates the entire area detection efficiency based on the respective post-correction similar area detection efficiencies calculated through the repetition processes of steps S420 to S530. Specifically, the calculation unit 367 calculates, for each of the plurality of similar areas, acquired through division performed on the first container area, a value which is acquired by multiplying the value, acquired by dividing the volume of the similar area by the volume of the first container area, by the post-correction similar area detection efficiency for the similar area. The calculation unit 367 calculates the sum of the plurality of calculated values as the entire area detection efficiency.

As described above, the calculation unit 367 calculates the entire area detection efficiency for each of the measurement target gamma-rays using the repetition processes of steps S410 to S200.

Therefore, the control apparatus 30 is capable of calculating further accurate entire area detection efficiency, compared to the method which is described in each of the first and second detailed examples which is used to calculate the entire area detection efficiency. As a result, the control apparatus 30 is capable of performing a predetermined process with higher accuracy based on the entire area detection efficiency.

As described above, the control apparatus 30 according the embodiment, for each of the plurality of similar areas, divides the similar area into the plurality of partial areas, calculates the partial area detection efficiency, which is the detection efficiency for each of the partial areas acquired through division, detected by the gamma-ray detection unit (in the example, gamma-ray detection unit 10) of the gamma-rays emitted from the sample (in the example, sample RA) included in the partial areas, and calculates the similar area detection efficiency based on the calculated partial area detection efficiency.

Therefore, the control apparatus 30 is capable of accurately calculating the detection efficiency (in the example, entire area detection efficiency), which is detected by the gamma-ray detection unit, of the gamma-rays emitted from the sample stuffed into the first container (in the example, first container MB1) based on the calculated partial area detection efficiency without performing the Monte-Carlo simulation.

In addition, the control apparatus 30 performs, for each of the plurality of similar areas, the TCS correction with respect to the similar area detection efficiency calculated for the similar area, and calculates the detection efficiency, which is detected by the gamma-ray detection unit, of the gamma-rays emitted from the sample in the first container based on the result of the TCS correction.

Therefore, the control apparatus 30 is capable of accurately performing the process based on the detection efficiency, which is calculated and which is detected by the gamma-ray detection unit, of the gamma-rays emitted from the sample in the first container.

Meanwhile, the measurement system 1 may be configured to not include a part or an entirety of the gamma-ray detection unit 10, the pulse height analysis apparatus 20, and the shielding body BK.

An inside of the shielding body BK may be configured to include a mechanism which automatically exchanges the container (for example, the first container MB1) attached to the gamma-ray detection unit 10 with another container (for example, a container which has a volume different from the first container MB1 and into which the sample RA is stuffed).

The inside of the shielding body BK may be configured to include a mechanism which automatically supplies the sample (for example, the sample RA) to an inside of the container (for example, the first container MB1) attached to the gamma-ray detection unit 10.

The above-described control apparatus 30 may be configured to perform self-absorption correction for each of the various processes, which are described above, as necessary, or may be configured to not perform the self-absorption correction.

Hereinabove, although the embodiment of the present invention is described with reference to the accompanying drawings, a detailed configuration is not limited to the embodiment, and may be modified, replaced, or removed without departing from the gist of the present invention.

In addition, a program used to realize a function of any component (for example, the control apparatus 30) in the above-described apparatus may be recorded in a computer-readable recording medium, and the program may be read and executed by a computer system.

Meanwhile, where, the "computer system" includes hardware such as an Operating System (OS) or peripherals.

In addition, the "computer-readable recording medium" includes a portable medium, such as a flexible disk, a magneto-optic disk, a ROM, a Compact Disk (CD)-ROM, and a storage device, such as hard disk, which is installed in the computer system. Furthermore, the "computer-readable recording medium" includes a volatile memory (RAM), which maintains a program during fixed time, in the computer system, which functions as a server or a client in a case where the program is transmitted via a network, such as the Internet, or a communication circuit, such as a telephone circuit.

In addition, the program may be transmitted from the computer system, which stores the program in a storage device or the like, to another computer system via a transmission medium or a carrier in the transmission medium.

Where, the "transmission medium", which is used to transmit the program, includes a medium, such as a network (communication network) including the Internet or a communication circuit (communication line) including a telephone circuit information, which has a function of transmitting information.

In addition, the program may be used to realize a part of the above-described function. Furthermore, the program may be a so-called difference file (difference program) which can be realized through combination with a program which already stores the above-described function in the computer system.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A measurement system comprising:
a control apparatus comprising a processor for calculating a detection efficiency, which is detected by a gamma-ray detection unit, of gamma-rays emitted from a first sample of a substance stuffed into a first container;
wherein a shape of the first container is a shape which surrounds at least a part of the gamma-ray detection unit that detects the gamma-rays,
wherein an area inside the first container is divided into a plurality of similar areas which are areas similar in shape to each other,
wherein the gamma-ray detection unit detects the gamma-rays emitted from the first sample included in each of the similar areas for each of the plurality of similar areas,
wherein, the processor calculates the detection efficiency as a similar-area-detection efficiency based on a result of detection performed by the gamma-ray detection unit,
wherein the processor calculates the similar-area-detection efficiency based on a first reference information for each of a plurality of second containers which stuff samples of the substance therein and which have a similar shape to the first container,
wherein each of the plurality of second containers have different volumes from each other,
wherein the processor divides the area inside the first container into the plurality of similar areas based on areas inside each of the plurality of second containers,
wherein the first reference information includes at least information in which a plurality of second container information and a plurality of first-reference-detection efficiency information respectively associated with each of the second container information are associated with each other,
wherein each of the plurality of second container information corresponds to the plurality of second containers, respectively,
wherein the first-reference-detection efficiency information indicates a reference detection efficiency detected by the gamma-ray detection unit, for each of gamma-rays having energies different from each other among the gamma-rays emitted from the samples inside each of the second containers, and
wherein the first reference information is at least one of generated by the processor or previously stored in the processor.

2. The measurement system according to claim 1, wherein the first container is a Marinelli-container.

3. The measurement system according to claim 1, wherein the gamma-ray detection unit includes a detection element that detects the gamma-rays, and
wherein the first container surrounds at least the detection element.

4. The measurement system according to claim 1, wherein the processor further divides each of the similar areas into a plurality of partial areas, for each of the plurality of similar areas,
wherein the gamma-ray detection unit detects the gamma-rays emitted from the sample included in each the partial areas for each of the plurality of the partial areas,
wherein, the processor calculates the detection efficiency as a partial-area-detection efficiency based on a result of detection performed by the gamma-ray detection unit, and
wherein, the processor calculates the similar-area-detection efficiency based on the partial-area-detection efficiency calculated for each of the partial areas.

5. The measurement system according to claim 1, wherein, the processor performs a true coincidence summing effect correction against the similar-area-detection efficiency which is calculated for each of the plurality of similar areas, and
wherein the processor calculates the detection efficiency, which is detected by the gamma-ray detection unit, of the gamma-rays emitted from the first sample inside the first container, based on a result of the true coincidence summing effect correction.

6. The measurement system according to claim 1, further comprising:
a shielding body that surrounds the first container, and shields the gamma-rays emitted from the sample included inside the first container.

7. The measurement system according to claim 1, further comprising:
a pulse height analysis apparatus that generates spectrum of the gamma-rays detected by the gamma-ray detection unit.

8. A measurement system comprising:
a control apparatus comprising a processor for calculating a detection efficiency, which is detected by a gamma-ray detection unit, of gamma-rays emitted from a first sample of a substance stuffed into a first container;
wherein a shape of the first container is a shape which surrounds at least a part of the gamma-ray detection unit that detects the gamma-rays,
wherein an area inside the first container is divided into a plurality of similar areas which are areas similar in shape to each other,
wherein the gamma-ray detection unit detects the gamma-rays emitted from the first sample included in each of the similar areas for each of the plurality of similar areas,
wherein, the processor calculates the detection efficiency as a similar-area-detection efficiency based on a result of detection performed by the gamma-ray detection unit,
wherein two third containers which stuff samples of the substance therein and which have a similar shape to the first container are provided,
wherein each of the two third containers have different volumes from each other,
wherein the processor divides the area inside the first container into the plurality of similar areas based on areas inside each of the two third containers, wherein the processor calculates the similar-area-detection efficiency based on a second reference information,
wherein the second reference information is information in which a plurality of volumes relating to the two third containers and a plurality of reference detection efficiencies respectively associated with each of the plurality of volumes are associated with each other,
wherein each of the plurality of reference detection efficiencies is detected by the gamma-ray detection unit, for each of gamma-rays having energies different from each other among the gamma-rays emitted from the samples inside the third container having the volume corresponding to the detection efficiency, and
wherein the second reference information is at least one of generated by the processor or previously stored in the processor.

9. The measurement system according to claim 8,
wherein the processor includes the plurality of reference detection efficiencies that serve as references for the detection efficiency,
wherein the processor generates the second reference information based on an information in which the plurality of reference detection efficiencies and a plurality of volumes respectively associated with each of the reference detection efficiencies are associated with each other.

10. A measurement system comprising:
a control apparatus comprising a processor for calculating a detection efficiency, which is detected by a gamma-ray detection unit, of gamma-rays emitted from a first sample of a substance stuffed into a first container;
wherein a shape of the first container is a shape which surrounds at least a part of the gamma-ray detection unit that detects the gamma-rays,
wherein an area inside the first container is divided into a plurality of similar areas which are areas similar in shape to each other,
wherein the gamma-ray detection unit detects the gamma-rays emitted from the sample included in each of the similar areas for each of the plurality of similar areas,
wherein, the processor calculates the detection efficiency as a similar-area-detection efficiency based on a result of detection performed by the gamma-ray detection unit,
wherein a plurality of third containers which stuff samples of the substance therein and which have a similar shape to the first container are provided,
wherein each of the plurality of third containers have different volumes from each other,
wherein the processor divides the area inside the first container into the plurality of similar areas based on areas inside each of the third containers,
where the processor calculates the similar-area-detection efficiency based on a second reference information,
wherein the second reference information is information in which a plurality of masses relating to the third container and a plurality of reference detection efficiencies respectively associated with each of the plurality of masses are associated with each other,
wherein each of the plurality of reference detection efficiencies is detected by the gamma-ray detection unit, for each of gamma-rays having energies different from each other among the gamma-rays emitted from the samples inside the third container having the mass corresponding to the detection efficiency, and wherein the second reference information is generated by the processor or previously stored in the processor.

11. A non-transitory storage medium having stored thereon a program that, when executed by a computer, causes the computer to calculate a detection efficiency, which is detected by a gamma-ray detection unit, of gamma-rays emitted from a sample stuffed into a first container having a shape surrounding at least a part of the gamma-ray detection unit that detects the gamma-rays, the program further causing the computer to perform:
dividing an area inside the first container into similar areas which are areas similar in shape to each other;
detecting the gamma-rays emitted from the first sample included in each the similar areas for each of the plurality of similar areas, by the gamma-ray detection unit;
calculating the detection efficiency as a similar-area-detection efficiency based on a result of the detection performed by the gamma-ray detection unit;
calculating the similar-area-detection efficiency based on a first reference information for each of a plurality of second containers which stuff samples of the substance therein and which have a similar shape to the first container, wherein each of the plurality of second containers have different volumes from each other;
dividing the area inside the first container into the plurality of similar areas based on areas inside each of the plurality of second containers;
wherein the first reference information includes at least information in which a plurality of second container information and a plurality of first-reference-detection efficiency information respectively associated with each of the second container information are associated with each other,
wherein each of the plurality of second container information corresponds to the plurality of second containers, respectively,
wherein the first-reference-detection efficiency information indicates a reference detection efficiency detected by the gamma-ray detection unit, for each of gamma-rays having energies different from each other among the gamma-rays emitted from the samples inside each of the second containers, and
wherein the first reference information is at least one of generated by the computer or previously stored in the computer.

12. A non-transitory storage medium having stored thereon a program that, when executed by a computer, causes the computer to calculate a detection efficiency, which is detected by a gamma-ray detection unit, of gamma-rays emitted from a sample stuffed into a first container having a shape surrounding at least a part of the gamma-ray detection unit that detects the gamma-rays, the program further causing the computer to perform:
dividing an area inside the first container into similar areas which is area similar in shape to each other;
detecting the gamma-rays emitted from the sample included in each the similar areas for each of the plurality of similar areas, by the gamma-ray detection unit;
calculating the detection efficiency as a similar-area-detection efficiency as based on a result of the detection performed by the gamma-ray detection unit,
wherein two third containers which stuff samples of the substance therein and which have a similar shape to the first container are provided, wherein each of the two third containers have different volumes from each other, wherein the program further causes the computer to perform dividing the area inside the first container into the plurality of similar areas based on areas inside each of the two third containers; and calculating the similar-area-detection efficiency based on a second reference information, wherein the second reference information is information in which a plurality of volumes relating to the two third containers and a plurality of reference detection efficiencies respectively associated with each of the plurality of volumes are associated with each other, wherein each of the plurality of reference detection efficiencies is detected by the gamma-ray detection unit, for each of gamma-rays having energies different from each other among the gamma-rays emitted from the samples inside the third container having the volume corresponding to the detection efficiency, and wherein the second reference information is at least one of generated by the computer or previously stored in the computer.

13. A non-transitory storage medium having stored thereon a program that, when executed by a computer, causes the computer to calculate a detection efficiency, which is detected by a gamma-ray detection unit, of gamma-rays emitted from a sample stuffed into a first container having a shape surrounding at least a part of the gamma-ray detection unit that detects the gamma-rays, the program further causing the computer to perform:

dividing an area inside the first container into similar areas which is area similar in shape to each other;

detecting the gamma-rays emitted from the sample included in each the similar areas for each of the plurality of similar areas, by the gamma-ray detection unit;

calculating the detection efficiency as a similar-area-detection efficiency as based on a result of the detection performed by the gamma-ray detection unit, wherein a plurality of third containers which stuff samples of the substance therein and which have a similar shape to the first container are provided, wherein each of the plurality of third containers have different volumes from each other, wherein the program further causes the computer to perform dividing the area inside the first container into the plurality of similar areas based on areas inside each of the third containers; and calculating the similar-area-detection efficiency based on a second reference information, wherein the second reference information is information in which a plurality of masses relating to the third container and a plurality of reference detection efficiencies respectively associated with each of the plurality of masses are associated with each other, wherein each of the plurality of reference detection efficiencies is detected by the gamma-ray detection unit, for each of gamma-rays having energies different from each other among the gamma-rays emitted from the samples inside the third container having the mass corresponding to the detection efficiency, and wherein the second reference information is generated by the computer or previously stored in the computer.

* * * * *